United States Patent
Kimmel

(10) Patent No.: US 8,224,777 B2
(45) Date of Patent: Jul. 17, 2012

(54) SYSTEM AND METHOD FOR GENERATING CONSISTENT IMAGES OF A SET OF DATA OBJECTS

(75) Inventor: Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 145 days.

(21) Appl. No.: 11/913,036

(22) PCT Filed: Apr. 28, 2006

(86) PCT No.: PCT/US2006/016422
§ 371 (c)(1),
(2), (4) Date: Jun. 24, 2008

(87) PCT Pub. No.: WO2006/119100
PCT Pub. Date: Nov. 9, 2006

(65) Prior Publication Data
US 2008/0275925 A1  Nov. 6, 2008

Related U.S. Application Data

(60) Provisional application No. 60/676,754, filed on Apr. 29, 2005.

(51) Int. Cl.
G06F 7/00 (2006.01)
G06F 17/00 (2006.01)
(52) U.S. Cl. .................. 707/639; 707/690
(58) Field of Classification Search ...... 707/2, 200–204, 707/639, 690
See application file for complete search history.

(56) References Cited

U.S. PATENT DOCUMENTS

| | | | |
|---|---|---|---|
| 4,075,691 A | 2/1978 | Davis et al. | |
| 4,803,621 A | 2/1989 | Kelly | |
| 4,819,159 A | 4/1989 | Shipley et al. | |
| 4,837,680 A | 6/1989 | Crockett et al. | |
| 5,101,492 A | 3/1992 | Schultz et al. | |
| 5,233,618 A | 8/1993 | Glider et al. | |
| 5,274,799 A | 12/1993 | Brant et al. | |
| 5,274,807 A | 12/1993 | Hoshen et al. | |
| 5,819,292 A | 10/1998 | Hitz et al. | |
| 6,205,450 B1 | 3/2001 | Kanome | |
| 6,671,773 B2 | 12/2003 | Kazar et al. | |
| 6,983,296 B1 * | 1/2006 | Muhlestein et al. | 707/206 |
| 7,069,307 B1 * | 6/2006 | Lee et al. | 709/217 |
| 7,076,509 B1 * | 7/2006 | Chen et al. | 707/202 |
| 7,127,577 B2 | 10/2006 | Koning et al. | |
| 7,143,307 B1 * | 11/2006 | Witte et al. | 714/6 |

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Hosain Alam
*Assistant Examiner* — Navneet K Ahluwalia
(74) *Attorney, Agent, or Firm* — Cesari and McKenna, LLP

(57) ABSTRACT

A system and method efficiently generates a set of parallel persistent consistency point images (PCPIs) of volumes configured as a SVS and served by a plurality of nodes interconnected as a cluster. A volume operations daemon (VOD) executing on a node of the cluster is configured to manage generation of the volume PCPIs. Notably, the set of PCPIs is generated substantially in parallel to thereby obtain a consistent and accurate point in time reference of the entire SVS.

17 Claims, 20 Drawing Sheets

U.S. PATENT DOCUMENTS

| | | | |
|---|---|---|---|
| 7,165,079 B1* | 1/2007 | Chen et al. | 707/202 |
| 7,409,494 B2 | 8/2008 | Edwards et al. | |
| 7,418,569 B1* | 8/2008 | Lee et al. | 711/200 |
| 7,698,289 B2 | 4/2010 | Kazar et al. | |
| 2003/0126247 A1 | 7/2003 | Strasser et al. | |
| 2003/0182317 A1* | 9/2003 | Kahn et al. | 707/200 |
| 2005/0044162 A1 | 2/2005 | Liang et al. | |
| 2005/0108375 A1* | 5/2005 | Hallak-Stamler | 709/223 |
| 2006/0248047 A1* | 11/2006 | Grier et al. | 707/2 |

OTHER PUBLICATIONS

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms, IEEE Transactions on Software Engineering*, 14( 2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109—Sep. 16, 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software—Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

U.S. Appl. No. 60/676,754, filed Apr. 29, 2005 for *System and Method for Generating Parallel Persistent Consistency Point Images*, by Kimmel, et al.

Silberschatz, Abraham, et al., Operating Concepts, Ch 3.7: Interprocess Communication, pp. 127-147, © 1988 Addison-Wesley Publishing Company, Inc.

"International Search Report", International Application No. PCT/US06/16422, International Filing Date Apr. 28, 2006, Mailed Feb. 2, 2007, 18 pages.

Kim, Michelle Y., Synchronized Disk Interleaving, IEEE Transactions on Computers, C-35(11):978-988, Nov. 1986.

Kim, Michelle, et al., Asynchronous Disk Interleaving Approximating Access Delays, IEEE Transactions on Computers, vol. 40, No. 7, Jul. 1991, pp. 801-810.

Bach, "The Design of the UNIX Operating System", Prentice-Hall, 1986, pp. 38-90 and 325-329, Jan. 1986.

Beach, Richard J., et al., "The Message is the Medium: Multiprocess Structuring of an Interactive Paint Program", Computer Graphics, vol. 16, No. 3, Jul. 1982, pp. 277-287.

Carlson, et al., "HP AdvanceNet: A Growth-Oriented Computer Networking Architectural Strategy", Hewlett-Packard Journal (Oct. 1986), p. 2, pp. 6-10.

Chao, Chia et al., "MIME: A High Performance Storage Device With Strong Recovery Guarantees", Hewlett-Packard Co, Mar. 18, 1992.

de Jonge, Wiebrand et al., The Logical Disk, A New Approach to Improving File Systems, Jan. 1984, p. 1-14, unpublished.

English et al., Loge: A Self-Organizing Disk Controller, Software and Systems Laboratory, Jan. 1991 (Hewlett-Packard.

Hanson, Per Brinch (editor), brochure: RC 400 Software Multiprogramming System, Ch 4: Process Communication, A/s Regnecentralen, Copenhagen—Apr. 1969.

Hitz, Dave et al., Technical Report: 3002: File System Design for an NFS File Server Appliance Network Appliance, Jan. 19, 1994.

Hitz, David, et al., Using Unix as One Component of a Lightweight Distributed Kernel for Multiprocessor File Servers, Auspex Technical Report 5, .COPYRGT.1990 Auspex Systems Inc.

IEEE Computer, "I/O subsystem", Sep. 1988, pp. 23-25 and 106.

Jones, Anita K., et al., StarOS, a Multiprocessor Operating System for the Support of Task Forces, Association for Computing Machinery, 1979, pp. 117-127.

Leffler, et al., The Design and Implementation of the 4.3BSD UNIX Operating System, Addison-Wesley, 1989, pp. 187-245.

Motorola, Inc., Microsystems Products Technical Data Sheet (1986), MicoMAP1-7, "MicroMAP MAnufacturing Automation Protocol Software".

Mulqueen, John T., Product Analysis Review, Communications Week, vol. 452, pp. 25, May 3, 1993.

Nelson, et al., "How and Why SCSI Is Better than IPI for NFS," Auspex Systems, Inc. Technical Report 6, 2nd edition, Jul. 1992.

Osadzinski, Alex, "The Network File System (NFS)", 8202 Computer Standards & Interfaces, 8 (1988/89) No. 1, pp. 45-48, Amsterdam, The Netherlands.

Ritchie, D.M. The UNIX System: A Stream Input-Output System, AT&T Bell Laboratories Technical Journal, Oct. 1984, vol. 63, No. 8 Part 2, .COPYRGT. 1984 AT&T.

Sandberg, "The Sun Network File System: Design, Implementation and Experience," Sun Microsystems, Inc. Technical Report, 1986.

Schwartz, Allan M., et al., LFS—A Local File System for Multiprocessor NFS Network Servers, Auspex Technical Report 4, .COPYRGT. 1989 Auspex Systems, Inc.

Seltzer, Margo, et al., An Implementation of a Log-Structured File System for UNIX, 1993 Winter UNIX, San Diego, CA.

Seltzer, Margo, File System Performance and Transaction Support, 1992.

Silberschatz, Abraham, et al., Operating Concepts, Ch 3.7: Interprocess Communication, pp. 127-147, .COPYRGT. 1988 Addison-Wesley Publishing Company, Inc.

Simpson, David, 'Appliances' Take Over File Server Role, Digital News and Review, vol. 11, No. 6, pp. 1-2, Mar. 21, 1994.

Sun Microsystems, Inc., Sun OS5.0 Network Interfaces Programmer's Guide, p. 108, Jun. 1992.

Sun Microsystems, "Network Programming Guide", Chapter 4, Remote Procedure Call Programming Guide, Revision A of Mar. 27, 1990, pp. 65-128.

Tannebaum, Andrew S., "Computer Networks" (1988), 2nd Edition, Prentice-Hall, pp. 35, 36, Chap. 9

Tribby, David M., "Network Services for HP Real-Time Computers", Hewlett-Packard Journal (Oct. 1986), pp. 22-27.

Tweten, David, Hiding Mass Storage Under UNIX: NASA's MSS II Architecture, IEEE, 1990, pp. 140-145.

Unix System Laboratories, Inc., Unix System V Release 4 Programmer's Guide: STREAMS, section 2: What is Streams?, AT & T Unix System Laboratories, Inc., Unix System V Release 4 Programmers's Guide: STREAMS. 1990 Prentice Hall.

* cited by examiner

SYSTEM AND METHOD FOR GENERATING CONSISTENT IMAGES OF A SET OF DATA OBJECTS

CROSS-REFERENCE TO RELATED APPLICATIONS

The present application claims the benefit of U.S. Provisional Patent Application Ser. No. 60/676,754, which was filed on Apr. 29, 2005, by Jeffrey S. Kimmel for a SYSTEM AND METHOD FOR GENERATING PARALLEL PERSISTENT CONSISTENCY POINT IMAGES and PCT Application US 2006/16422 filed on Apr. 28, 2006 by Jeffrey S. Kimmel for a SYSTEM AND METHOD FOR GENERATING PARALLEL PERSISTENT CONSISTENCY POINT IMAGES, both of which are hereby incorporated by reference.

The present application is related to U.S. patent application Ser. No. 11/119,278, entitled STORAGE SYSTEM ARCHITECTURE FOR STRIPING DATA CONTAINER CONTENT ACROSS VOLUMES OF A CLUSTER, by Michael Kazar. et al., now issued as U.S. Pat. No. 7,698,289 on Apr. 13, 2010, the contents of which are hereby incorporated by reference.

FIELD OF THE INVENTION

The present invention is directed to storage systems and, in particular to generating a set of consistent images of a set of data objects.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file to system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

Certain file systems have the capability to generate snapshots of their active file systems. An "active file system" is a file system to which data can be both written and read, or, more generally, an active store that responds to both read and write input/output (I/O) operations. It should be noted that "snapshot" is a trademark of Network Appliance, Inc. and is used for purposes of this patent to designate a persistent consistency point (CP) image. A persistent consistency point image (PCPI) is a point-in-time read-only image of data accessible by name that provides a consistent image of that data at some previous time. More particularly, a PCPI is a point-in-time representation of a storage element, such as an active file system, file, volume or database, stored on one or more storage devices (e.g., on disks) or other persistent memory and having a name or other identifier that distinguishes it from other PCPIs taken at other points in time. A PCPI can also include other information (meta-data) about the active file system at the particular point in time for which the image is taken. More generally, as used herein, a PCPI may denote any point in time copy mechanism associated with any particular file system. The terms "PCPI" and "snapshot" may be used interchangeably through out this patent without derogation of Network Appliance's trademark rights.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), storage area network (SAN) or virtual private network (VPN) implemented over a public network such as the Internet. Each client may request the services of the storage system by issuing file-based and block-based protocol messages (in the form of packets) to the system over the network.

A plurality of storage systems may be deployed to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. One technique for data container striping is described in the above-referenced U.S. Pat. No. 7,698,289, entitled STORAGE SYSTEM ARCHITECTURE FOR STRIPING DATA CONTAINER CONTENT ACROSS VOLUMES OF A CLUSTER. Broadly stated, stripes of content (data) of a data container are allocated to each volume of the SVS in a manner that balances data across the volumes of the SVS. Each stripe has a defined size/width as specified by a set of striping rules associated with the SVS.

A noted disadvantage arises when configuring a SVS on a cluster of storage systems, wherein each storage system may implement a file system capable of generating a PCPI and wherein each volume of the SVS may be serviced by a different storage system is in the cluster. Accordingly, no single storage system may serve the entirety of the SVS, i.e., all volumes of the SVS. As such, if a PCPI is generated of an individual volume, the contents of that PCPI may not be consistent with some point in time state of the entire SVS.

SUMMARY OF THE INVENTION

The present invention overcomes the disadvantages of the prior art by providing a system and method for efficiently generating a set of consistent images of a plurality of data objects. According to an illustrative general embodiment of the invention, an agent is initiated to generate the set of consistent images. The agent optionally transmits a first message to each of the storage systems servicing one or more of the data objects. In response to this message, each storage system sets a first marker and then returns an acknowledgement to the agent. The first marker forces each storage system to complete any time-consuming, in progress operations that modify the data object but to hold any newly received time-consuming operations that modify the data object. Once the agent receives acknowledgements from each of the storage systems, it then transmits a second message to each of the storage systems, which, in response, set a second marker before returning an acknowledgement. The second marker forces each storage system to complete any additional in progress operations that modify the data objects and to hold all newly received operations until the consistent image is created. Once its second marker has been set, each storage system may capture a consistent image of the data objects. After the agent has received the second acknowledgement from each storage system, it then transmits a commit message to each storage system, which causes each storage system to clear the first and second markers after the consistent image has been captured.

In an alternative embodiment, the present invention generates a set of synchronized parallel persistent consistency point images (PCPIs) of volumes configured as a striped volume set (SVS) and served by a plurality of nodes interconnected as a cluster. Each node of the cluster includes (i) a disk element (D-blade) having a file system and a volume striping module (VSM) that cooperate to service a volume of the SVS and (ii) a network element (N-blade) adapted to redirect a data access request from a client to any D-blade of the cluster.

According to the invention, an administrator initiates the creation of the PCPIs by issuing a PCPI generation command to a volume operations daemon (VOD). In response, the VOD informs the VSM of the meta-data volume (MDV) to initiate a parallel or synchronized PCPI of the SVS. The VSM for the MDV then performs a CP and sends a request to each VSM serving a data volume (DV) of the striped volume set to perform a CP. Each of the VSMs then performs a CP of the appropriate DV. These "priming" CPs are utilized to flush the majority of dirty data out of any caches and to enable later PCPI productions an expedited basis. Once the VSM of the MDV receives an acknowledgment from each DV that it has performed an initial priming CP, the VSM of the MDV sets a first marker and sends a preparatory message to each DV. Upon receipt, the VSM for each DV sets a first marker and returns an acknowledgement to the VSM of the MDV. After receiving an acknowledgment from each DV, the VSM of the MDV sets a second marker and generates a PCPI of the MDV. The VSM also sends a perform synchronized PCPI request to each DV, which causes the VSM for each DV to set a second marker and to generate a PCPI of the DV. The VSM of the MDV then sends a complete synchronized PCPI request to each DV, which causes the VSMs for each DV to remove the first and second markers and to return an acknowledgement. Once the MDV has received acknowledgements from each DV, the VSM for the MDV then removes its first and second markers. At this point the synchronized and parallel PCPIs have been generated.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
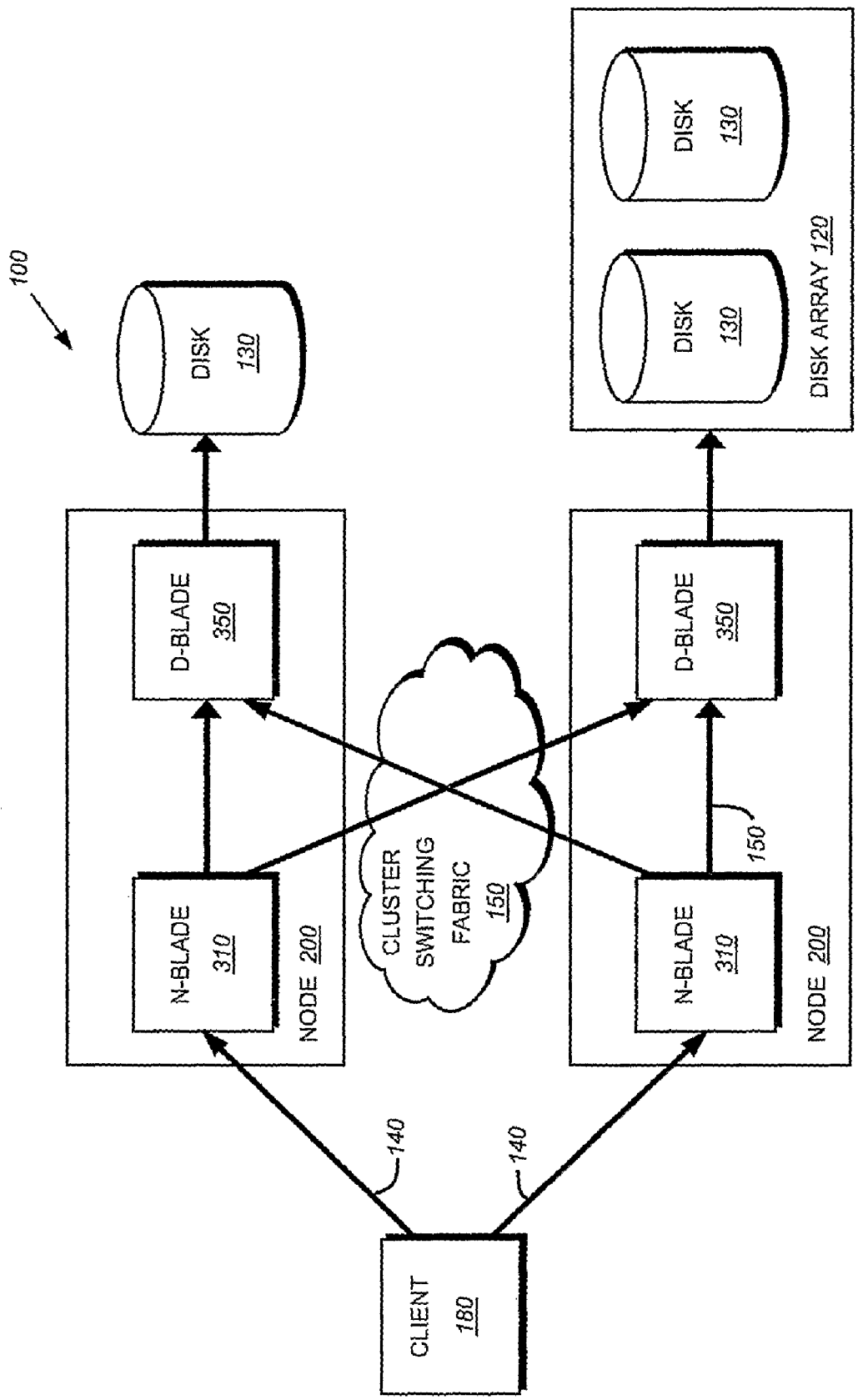
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, which is now issued as U.S. Pat. No. 6,671,773 on Dec. 30, 2003. It should be noted that while there is shown an equal number of N and D-blades in the illustrative cluster 100, there may be differing numbers of N and/or D-blades in accordance with various embodiments of the present invention. For example, there may be a plurality of N-blades and/or Dblades interconnected in a cluster configuration 100 that does not reflect a one-to-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
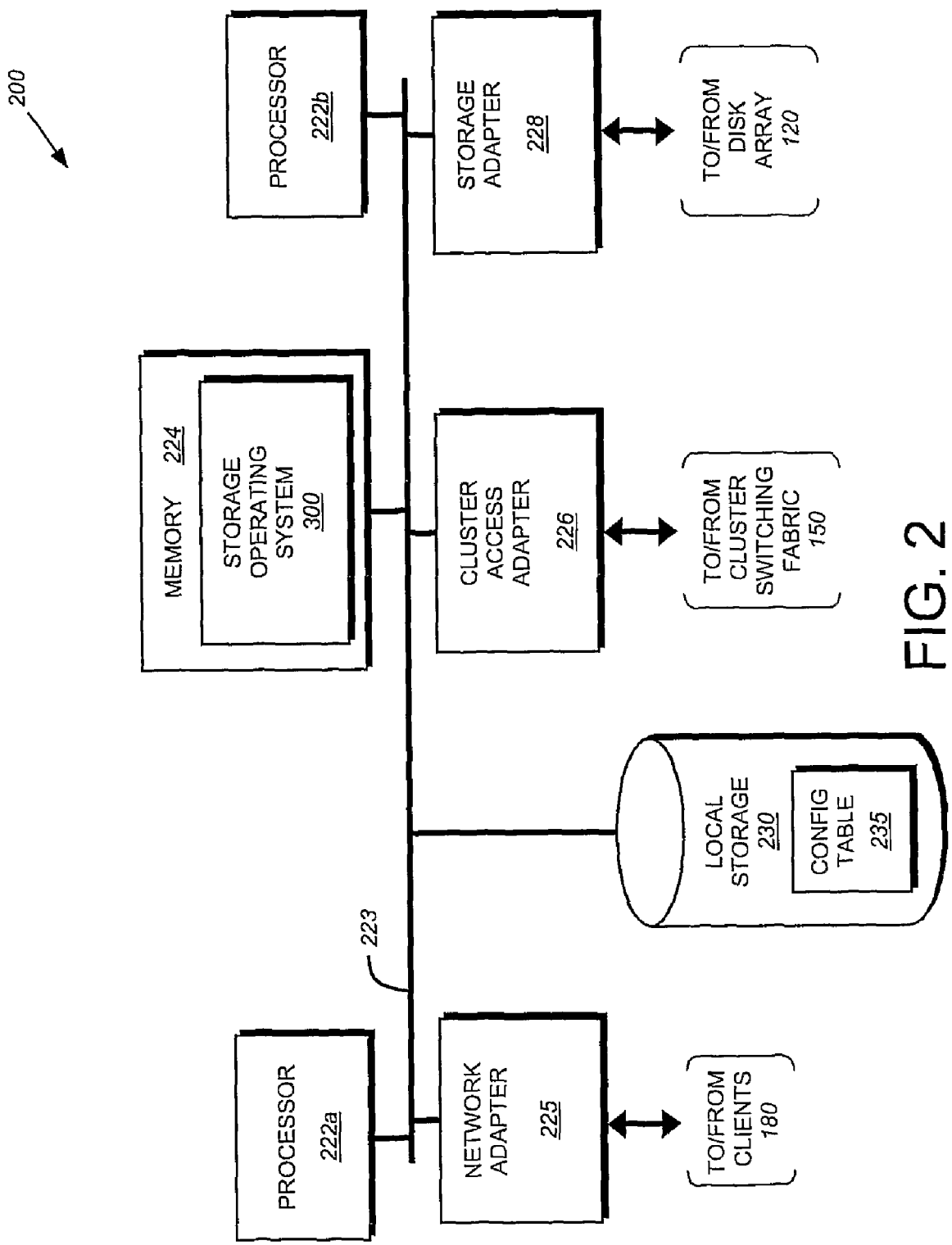
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted is file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
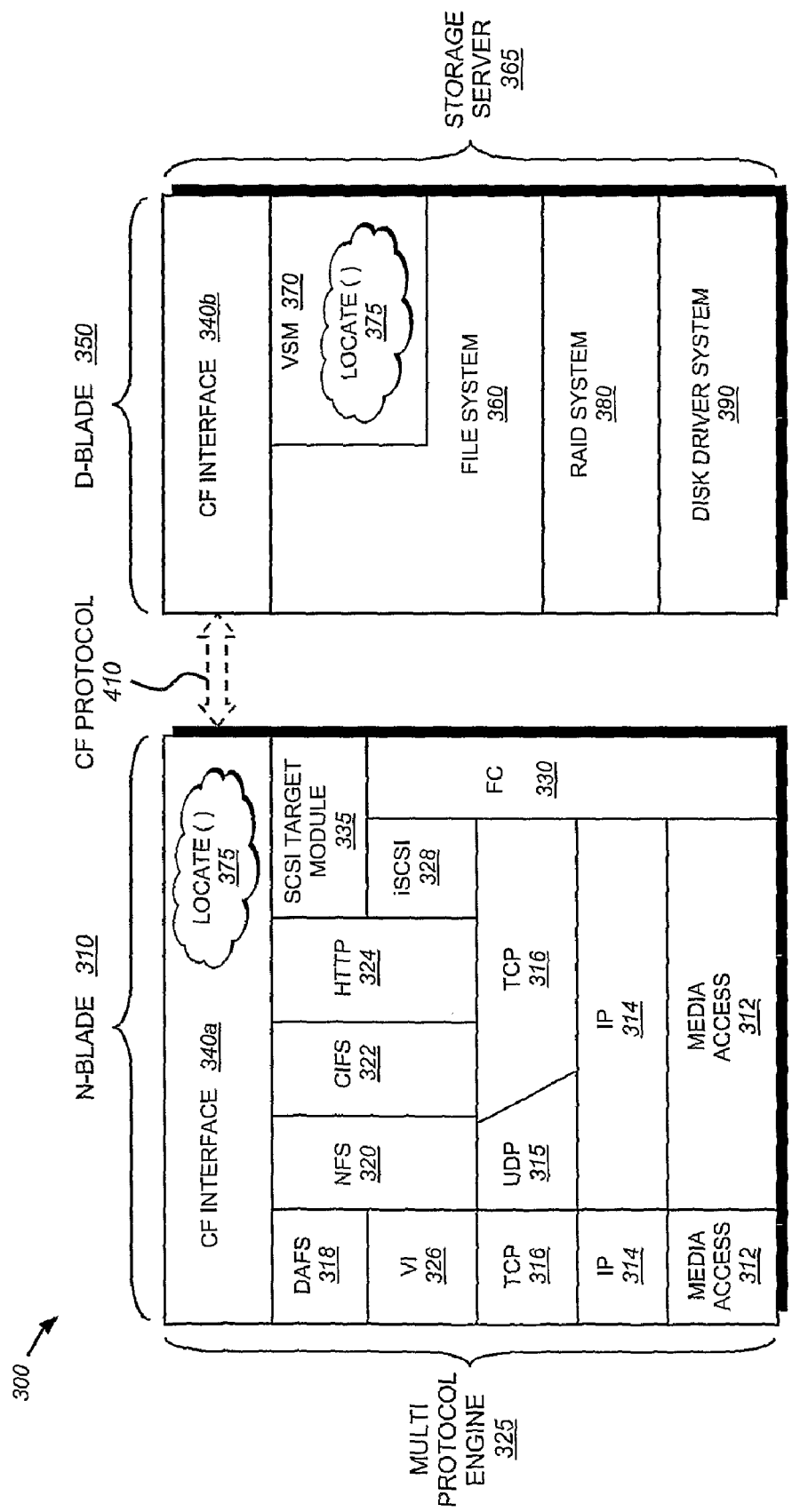
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSIspecific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information is stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) of the present invention. As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; is these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

D. CF Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340a,b adapted to implement intra-cluster communication among the blades, including D-blade-to-D-blade communication for data container striping operations described herein.

The protocol layers, e.g., the NFS/CIFS layers and the iSCSI/FC layers, of the N-blade 310 function as protocol servers that translate file-based and block based data access requests from clients into CF protocol messages used for communication with the D-blade 350. That is, the N-blade servers convert the incoming data access requests into file system primitive operations (commands) that are embedded within CF messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command.

Figure 4:
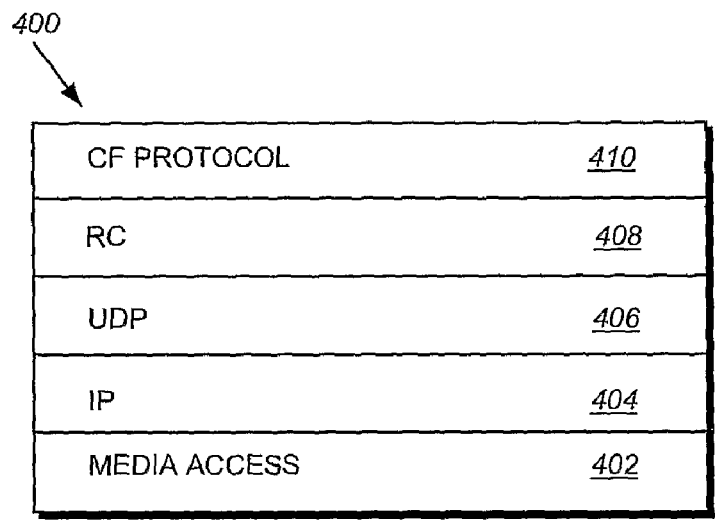
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote blades of the cluster 100; however, it should be understood that the term "CF message" may be used generally to refer to LPC and RPC communication between blades of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-blade 310) to a destination (e.g., a D-blade 350). The RC layer 408 implements a reliable transport protocol that is adapted to process such envelopes in accordance with a connectionless protocol, such as UDP 406.

Figure 5:
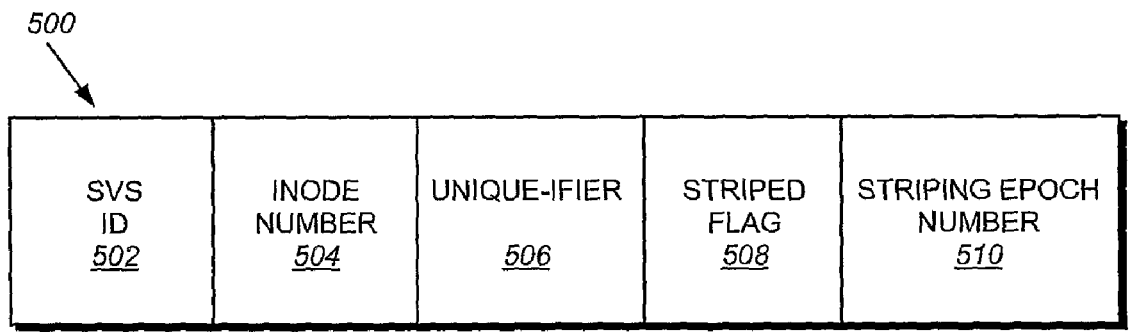
FIG. 5 is a schematic block diagram illustrating the format of a data container handle in accordance with an embodiment of the present invention.

A data container, e.g., a file, is accessed in the file system using a data container is handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The iode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 illustratively holds a Boolean value that identifies whether the data container is striped or not. The content of the striping epoch number field 510 indicates the appropriate striping technique for use with the data container for embodiments where the SVS utilizes differing striping techniques for different data containers.

E. File System Organization

Figure 6:
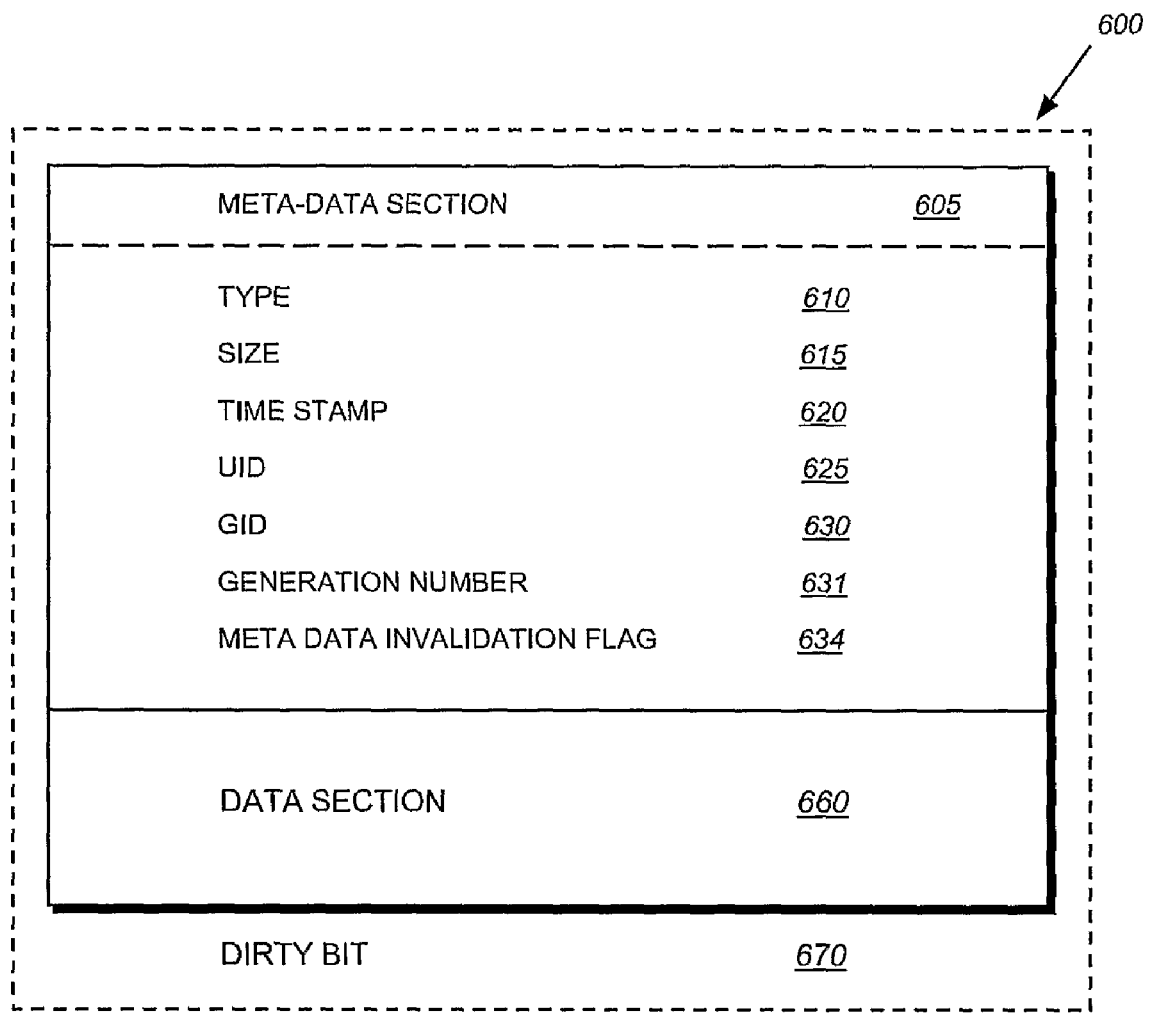
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 634. Meta-data invalidation flag field 634 is used to indicate whether meta-data in this inode is usable or whether it should be re-acquired from a meta-data volume (MDV) of the SVS. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk Mode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 660 of the inode (e.g., a second level inode) references an indirect block (e.g., a first level L1 block) that contains 1024 pointers, each of which references a 4 kB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect block (e.g., a first level L1) block. The indirect block, in turn, that contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously is incorporated U.S. Pat. No. 5,818,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1898.

Figure 7:
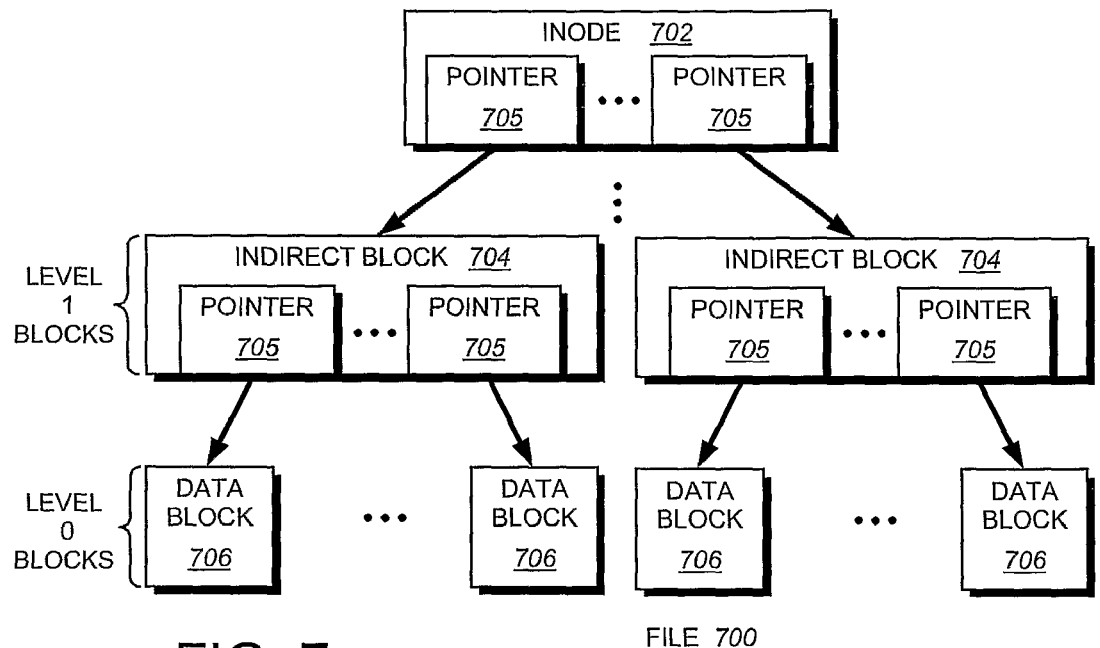
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc., which is now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

Figure 8:
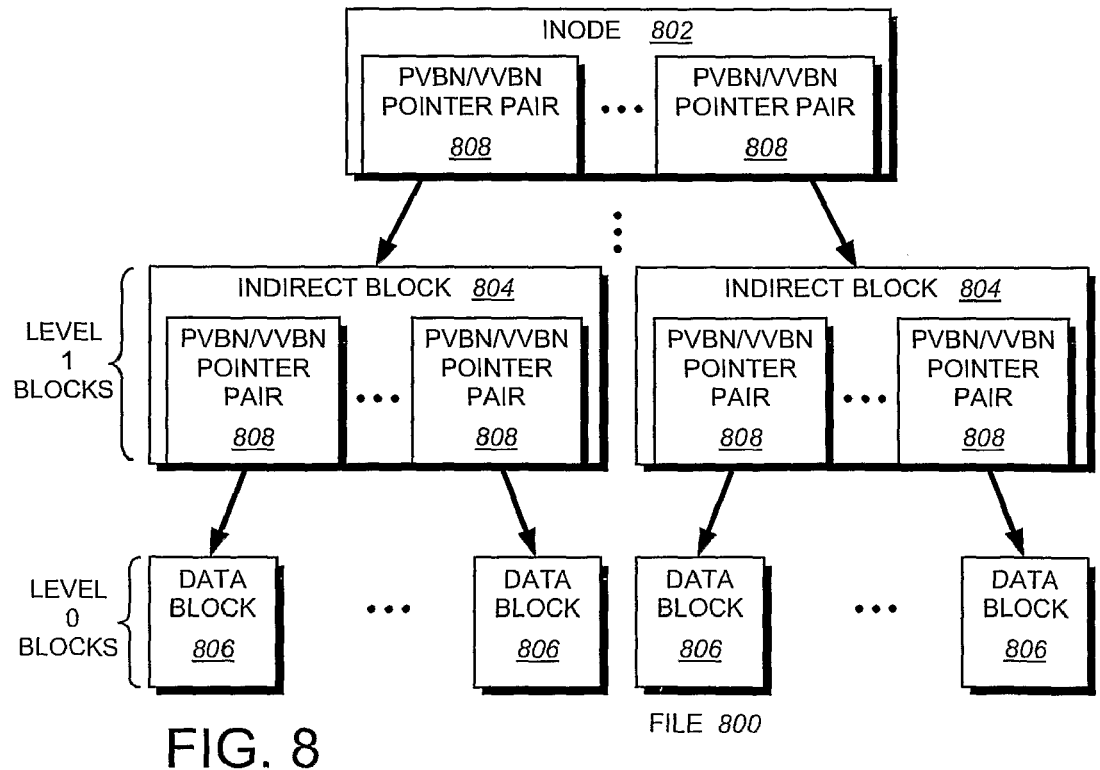
FIG. 8 is a schematic block diagram of an illustrative embodiment of a buffer tree of a file that may be advantageously used with the present invention.

FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perfaun pvbn-to-vvbn translations; yet, on the read path, the pvbn is available.

Figure 9:
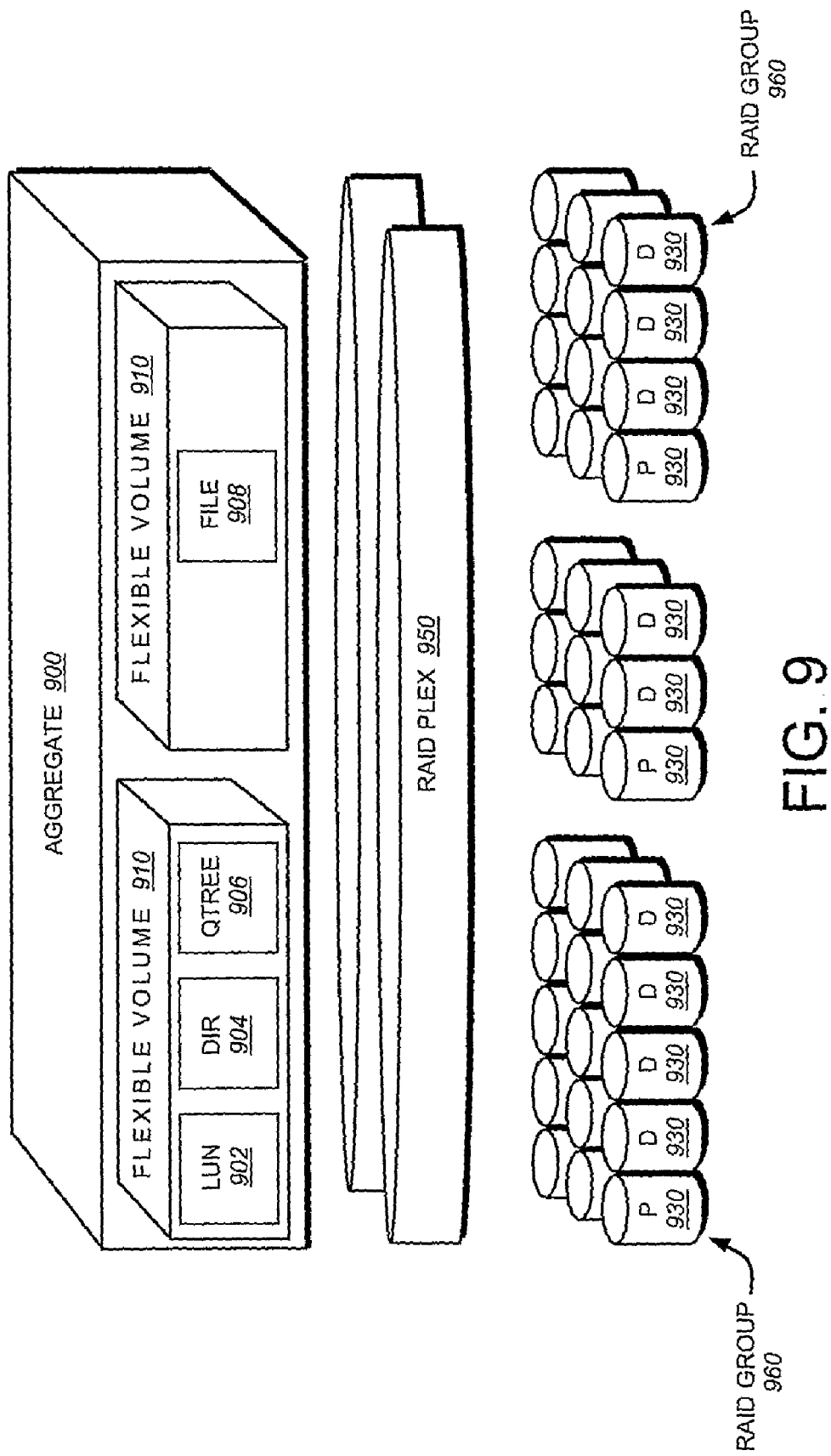
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains is at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
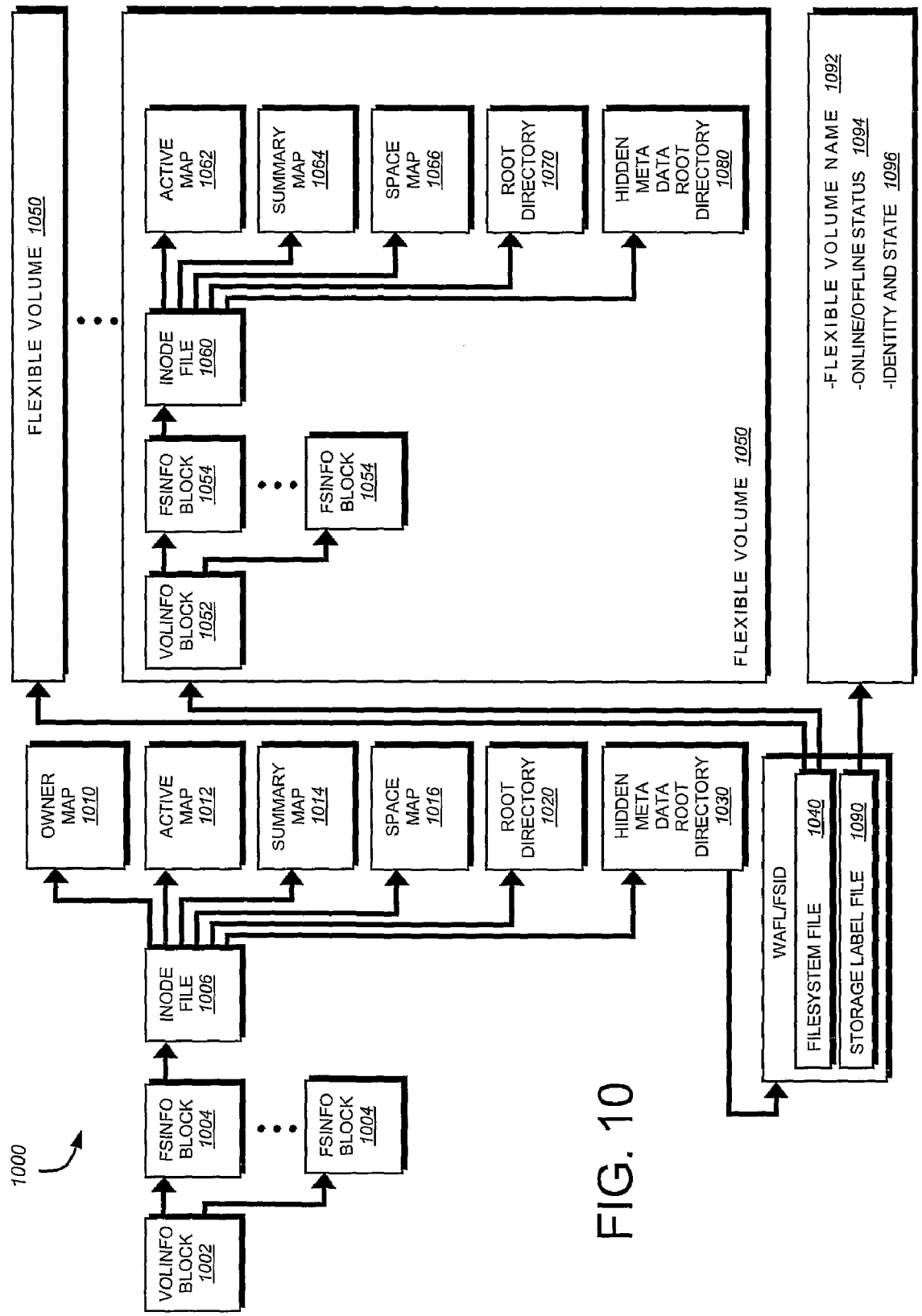
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a PCPI of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a PCPI, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
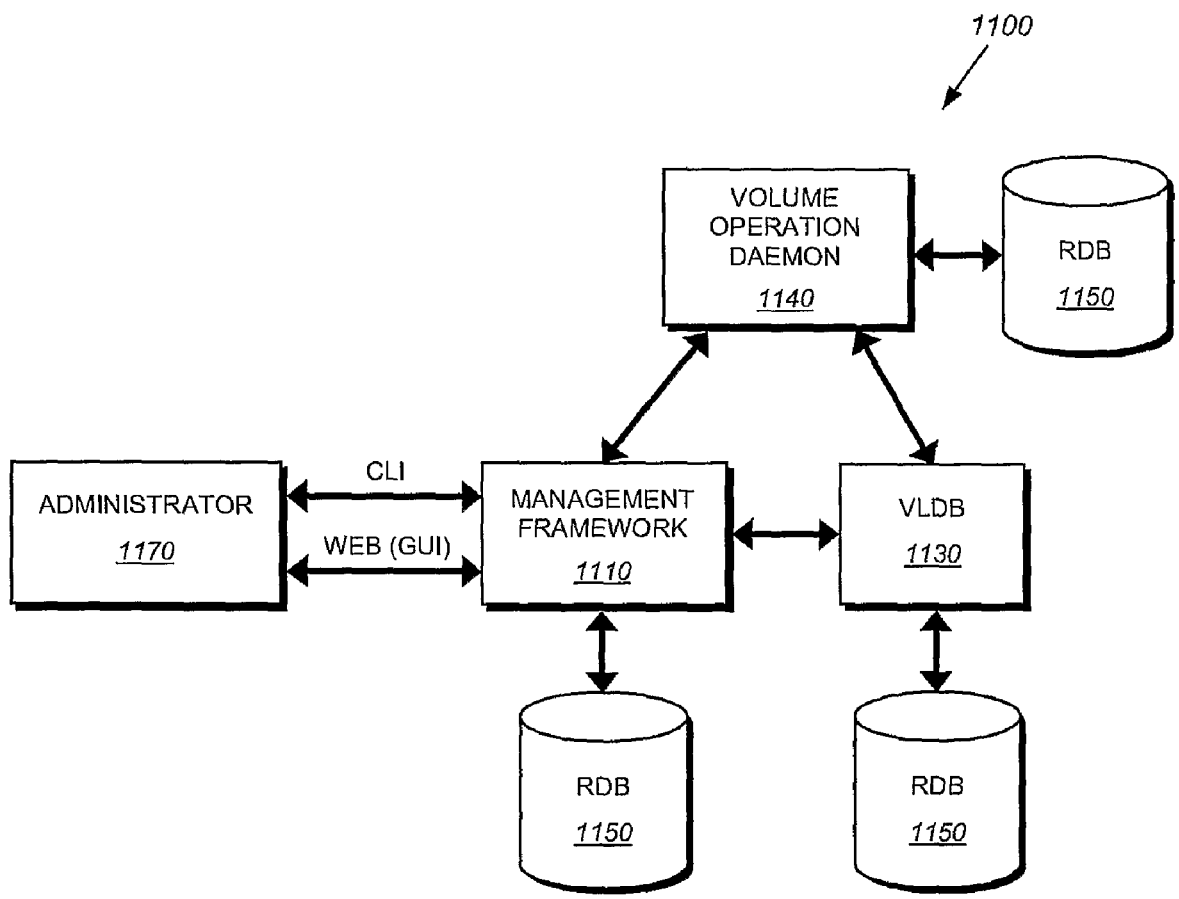
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110, a volume operations daemon (VOD) 1140 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VOD 1140 is a management daemon that continuously executes to service various volume-level operations, such as volume migration operations. In the illustrative embodiment, VOD 1140 interfaces with the management framework 1110 and the VLDB 1130 to receive commands and access various data structures, respectively. Moreover, as described further herein, the VOD 1140 manages the creation (generation) of parallel PCPIs in a SVS in accordance with the present invention.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-blade 310 of each node accesses a configuration table 235 that maps the SVS ID 502 of a data container handle 500 to a D-blade 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
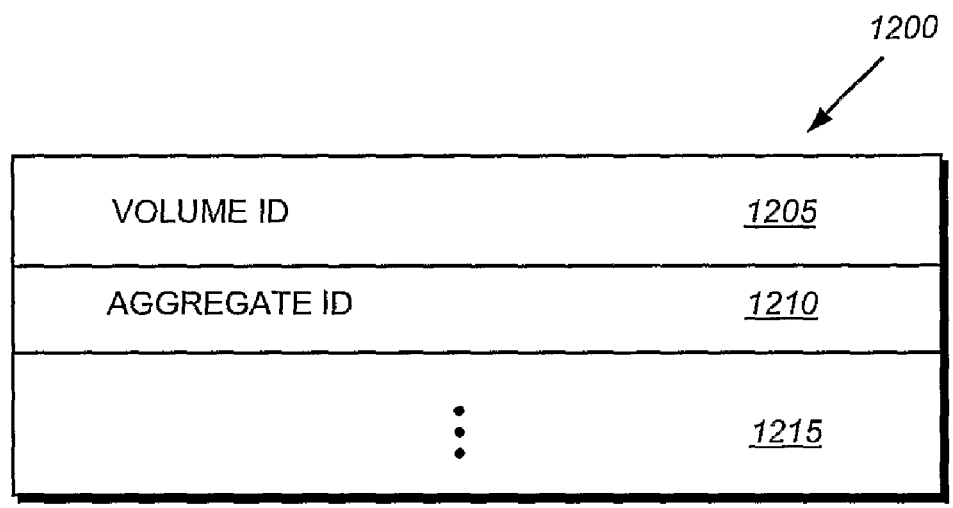
FIG. 12 is a schematic block diagram of a volume location database (VLDB) volume entry in accordance with an embodiment of the present invention.
Figure 13:
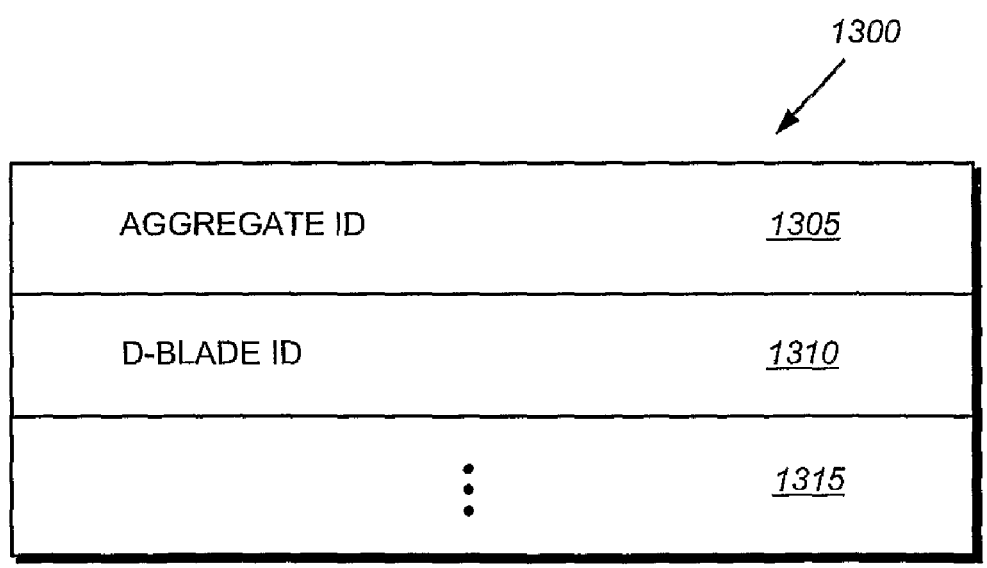
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-blade ID field 1310 and, in alternate embodiments, additional fields 1315. The aggregate ID field 1305 contains an ID of a particular aggregate 900 in the cluster 100. The D-blade ID field 1310 to contains an ID of the D-blade hosting the particular aggregate identified by the aggregate ID field 1305.

The VLDB illustratively implements a RPC interface, e.g., a Sun RPC interface, which allows the N-blade 310 to query the VLDB 1130. When encountering contents of a data container handle 500 that are not stored in its configuration table, the N-blade sends an RPC to the VLDB process. In response, the VLDB 1130 returns to the N-blade the appropriate mapping information, including an ID of the D-blade that owns the data container. The N-blade caches the information in its configuration table 235 and uses the D-blade ID to forward the incoming request to the appropriate data container. All functions and interactions between the N-blade 310 and D-blade 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

The present invention is related to a storage system architecture illustratively comprising two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

Specifically, the SVS comprises a MDV and one or more data volumes (DV). The MDV is configured to store a canonical copy of certain meta-data, including access control lists (ACLs) and directories, associated with all files stored on the SVS, whereas each DV is configured to store, at least, data content of those files. For each file stored on the SVS, one volume is designated a container attribute volume (CAV) and, to that end, is configured to store ("cache") certain, rapidly-changing attribute meta-data, includes ing time stamps and file length, associated with that file to thereby offload access requests that would otherwise be directed to the MDV. In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In alternate embodiments, data for files is striped across the MDV and the DVs.

Figure 14:
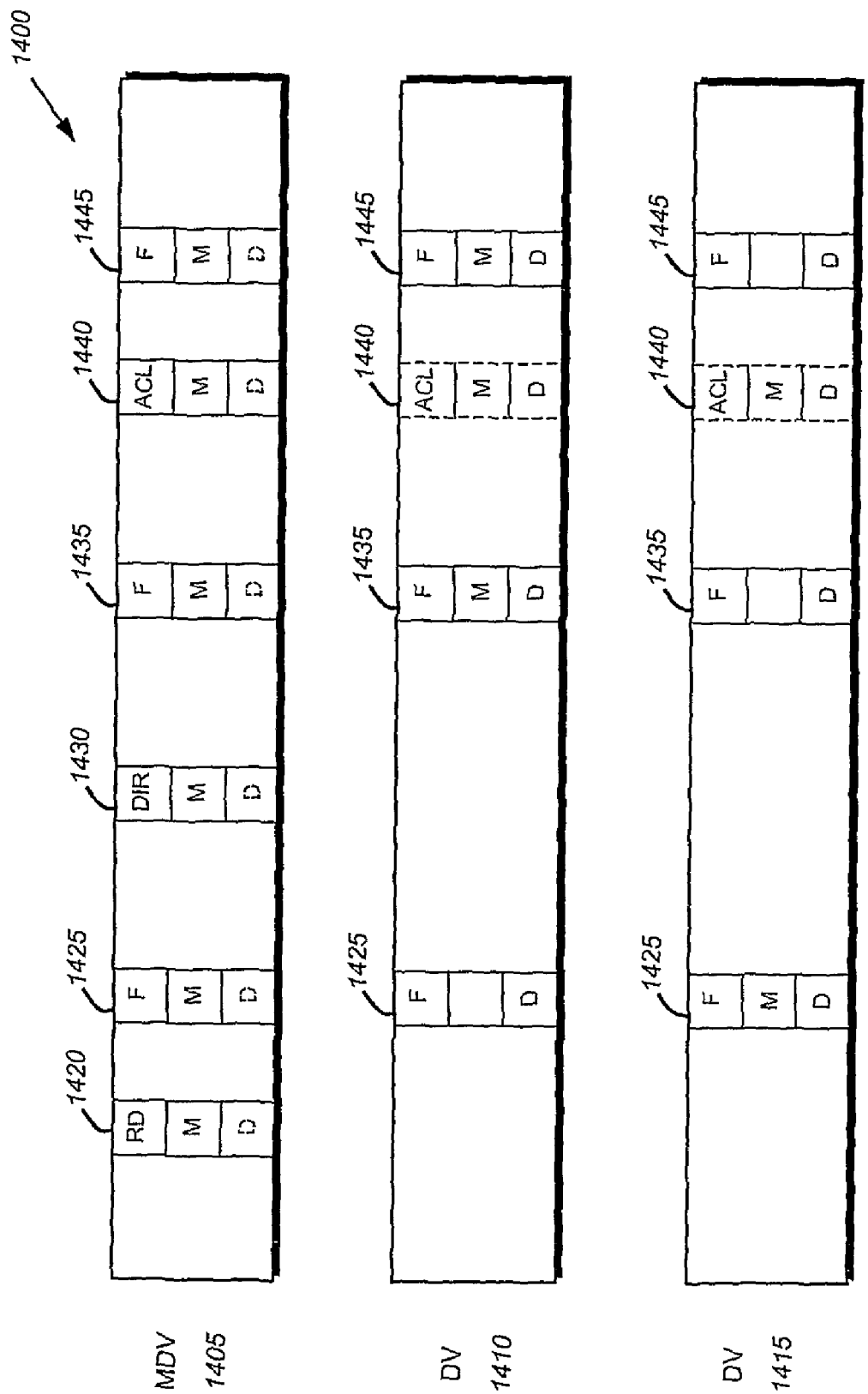
FIG. 14 is a schematic block diagram of a striped volume set (SVS) in accordance with an embodiment of the present invention.

FIG. 14 is a schematic block diagram of the inode files of an SVS 1400 in accordance with an embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a plurality of inodes, including a root directory (RD) inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include user data (D); however, in alternate embodiments, the MDV may include user data.

In contrast, each DV 1410, 1415 stores only file (F) inodes 1425, 1435, 1445 and CL inode 1440. According to the storage system architecture, a DV does not store directories or other device inodes/constructs, such as symbolic links; however, each DV does store F inodes, and may store cached copies of ACL inodes, that are arranged in the same locations as their respective inodes in the MDV 1405. A particular DV may not store a copy of an inode until an I/O request for the data container associated with the inode is received by the D-Blade serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by is inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time stamps 620.

Figure 15:
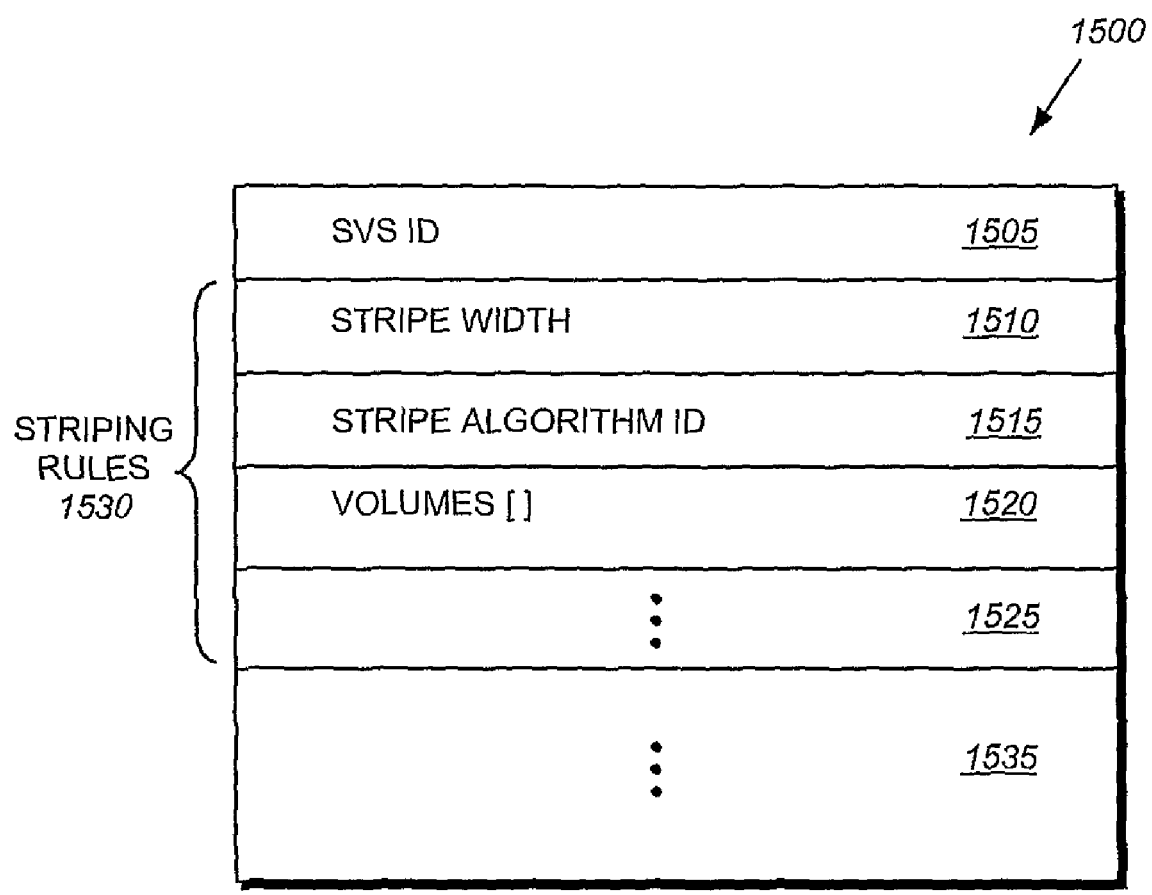
FIG. 15 is a schematic block diagram of a VLDB SVS entry in accordance with an embodiment the present invention.

In addition, the SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 15 is a schematic block diagram of an exemplary VLDB SVS entry 1500 in accordance with an embodiment of the present invention. The VLDB entry 1500 includes a SVS ID field 1505 and one or more sets of striping rules 1530. In alternate embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe. The ordered list of volumes field 1520 contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list to may denote the manner of implementing a particular striping algorithm, e.g., round-robin.

As noted, a Locate( ) function 375 is provided that enables the VSM 370 and other modules (such as those of N-blade 310) to locate a D-blade 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 180 and received at the N-blade 310 of a node 200, where it is parsed through the multi-protocol engine 325 to the appropriate protocol server of N-blade 310.

To determine the location of a D-blade 350 to which to transmit a CF message 400, the N-blade 310 may first retrieve a SVS entry 1500 to acquire the striping rules 1530 (and list of volumes 1520) associated with the SVS. The N-blade 310 then executes the Locate( ) function 375 to identify the appropriate volume to which to direct an operation. Thereafter, the N-Blade may retrieve the appropriate VLDB volume entry 1200 to identify the aggregate containing the volume and the appropriate VLDB aggregate entry 1300 to ultimately identify the appropriate D-blade 350. The protocol server of N-blade 310 then transmits the CF message 400 to the D-blade 350.

Figure 16:
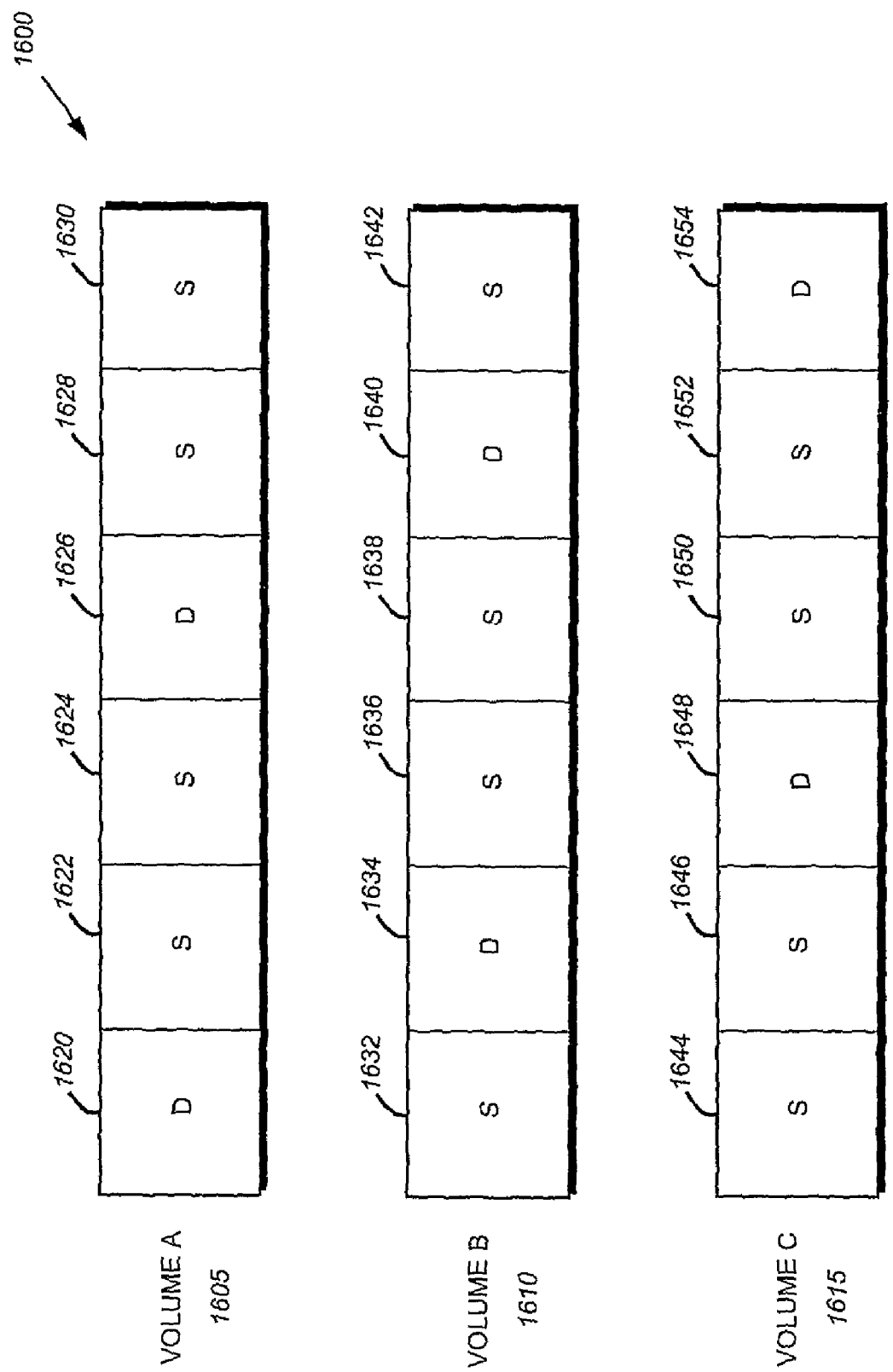
FIG. 16 is a schematic block diagram illustrating the periodic sparseness of file content stored on volumes of a SVS in accordance with an embodiment of the present invention.

FIG. 16 is a schematic block diagram illustrating the periodic sparseness of file content stored on volumes A 1605, B 1610 and C 1615 of SVS 1600 in accordance with an embodiment of the present invention. As noted, file content is periodically sparse according to the SVS striping rules, which specify a striping algorithm (as indicated by stripe algorithm ID field 1515) and a size/width of each stripe (as indicated by stripe width field 1510). Note that, in the illustrative embodiment, a stripe width is selected to ensure that each stripe may accommodate the actual data (e.g., stored in data blocks 806) referenced by an indirect block (e.g., level 1 block 804) of a file.

In accordance with an illustrative round robin striping algorithm, volume A 1605 contains a stripe of file content or data (D) 1620 followed, in sequence, by two stripes of sparseness (S) 1622, 1624, another stripe of data (D) 1626 and two stripes of sparseness (S) 1628, 1630. Volume B 1610, on the other hand, contains a stripe of sparseness (S) 1632 followed, in sequence, by a stripe of data (D) 1634, two stripes of sparseness (S) 1636, 1638, another stripe of data (D) 1640 and a stripe of sparseness (S) 1642. Volume 1615 continues the round robin striping pattern and, to that end, contains two stripes of sparseness (S) 1644, 1646 followed, in sequence, by a stripe of data (D) 1648, two stripes of sparseness (S) 1650, 1652 and another stripe of data (D) 1654.

H. Persistent Consistency Point Images (PCPIs)

The file system (such as the WAFL file system) illustratively has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file, volume or database, stored on a storage device (e.g., on disk) or other persistent memory and having a name or other identifier that distinguishes it from other PCPIs taken at other points in time.

In the case of the WAFL file system, a PCPI is always an active file system image that contains complete information about the file system, including all meta-data. A PCPI can also include other information (meta-data) about the active file system at the particular point in time for which the image is taken. The terms "PCPI" and "snapshot" may be used interchangeably through out this patent without derogation of Network Appliance's trademark rights. In the example of a WAFL file system, snapshots are described in TR3002 FILE SYSTEM DESIGN FOR A NFS FILE SERVER APPLIANCE by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

Figure 17:
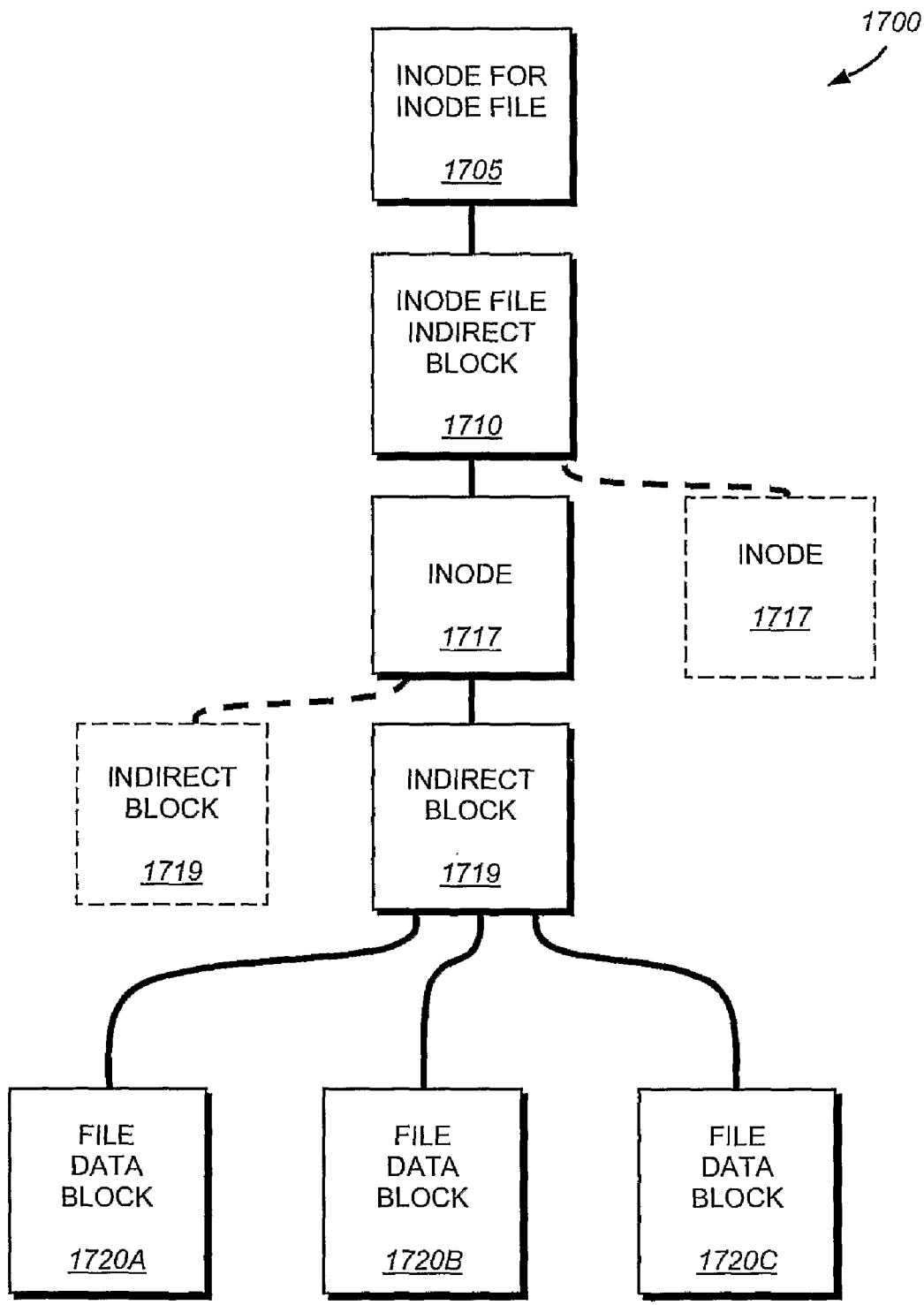
FIG. 17 is a schematic block diagram of an exemplary inode buffer tree in accordance with an embodiment of the present invention.

Broadly stated, a PCPI is stored in persistent storage along with the active file system, and is called into the memory of the storage system as requested by the storage operating system. The organization of the snapshot and the active file system can be understood from the following description of an exemplary file system inode structure 1700 shown in FIG. 17. The inode for an inode file 1705 contains information describing the is inode file associated with a file system. In this exemplary file system inode structure, the inode for the inode file 1705 contains a pointer that references (points to) an inode file indirect block 1710. The inode file indirect block 1710 contains a set of pointers that reference inode file blocks, each of which contains an array of inodes 1717 which, in turn, contain pointers to indirect blocks 1719. The indirect blocks 1719 include pointers to file data blocks 1720A, 1720B and 1720C. Each of the file data blocks 1720(A-C) is capable of storing, e.g., 4 kB of data.

Figure 18:
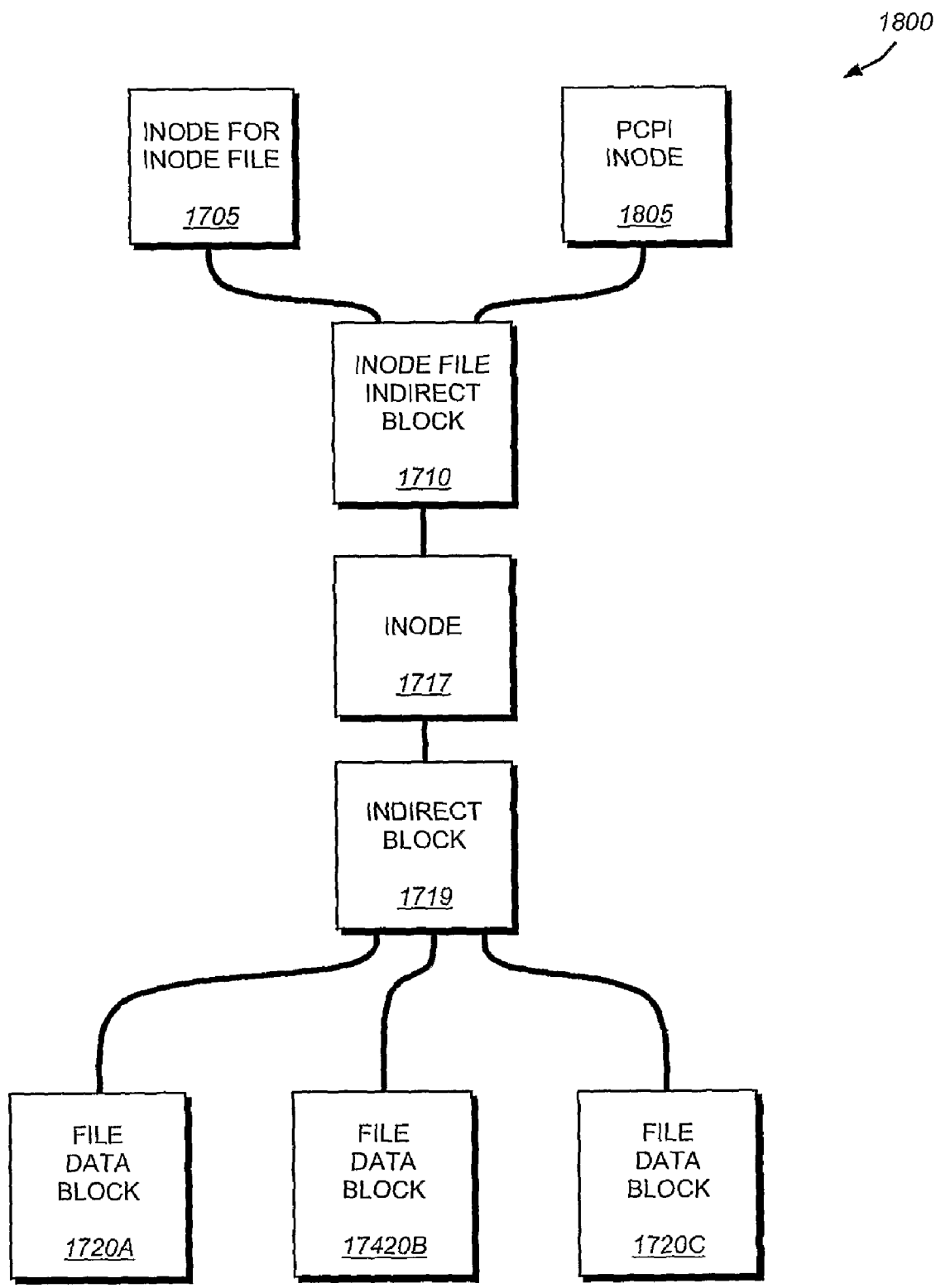
FIG. 18 is a schematic block diagram of an exemplary inode buffer tree showing a is persistent consistency point (PCPI) inode in accordance with an embodiment of the present invention.
Figure 19:
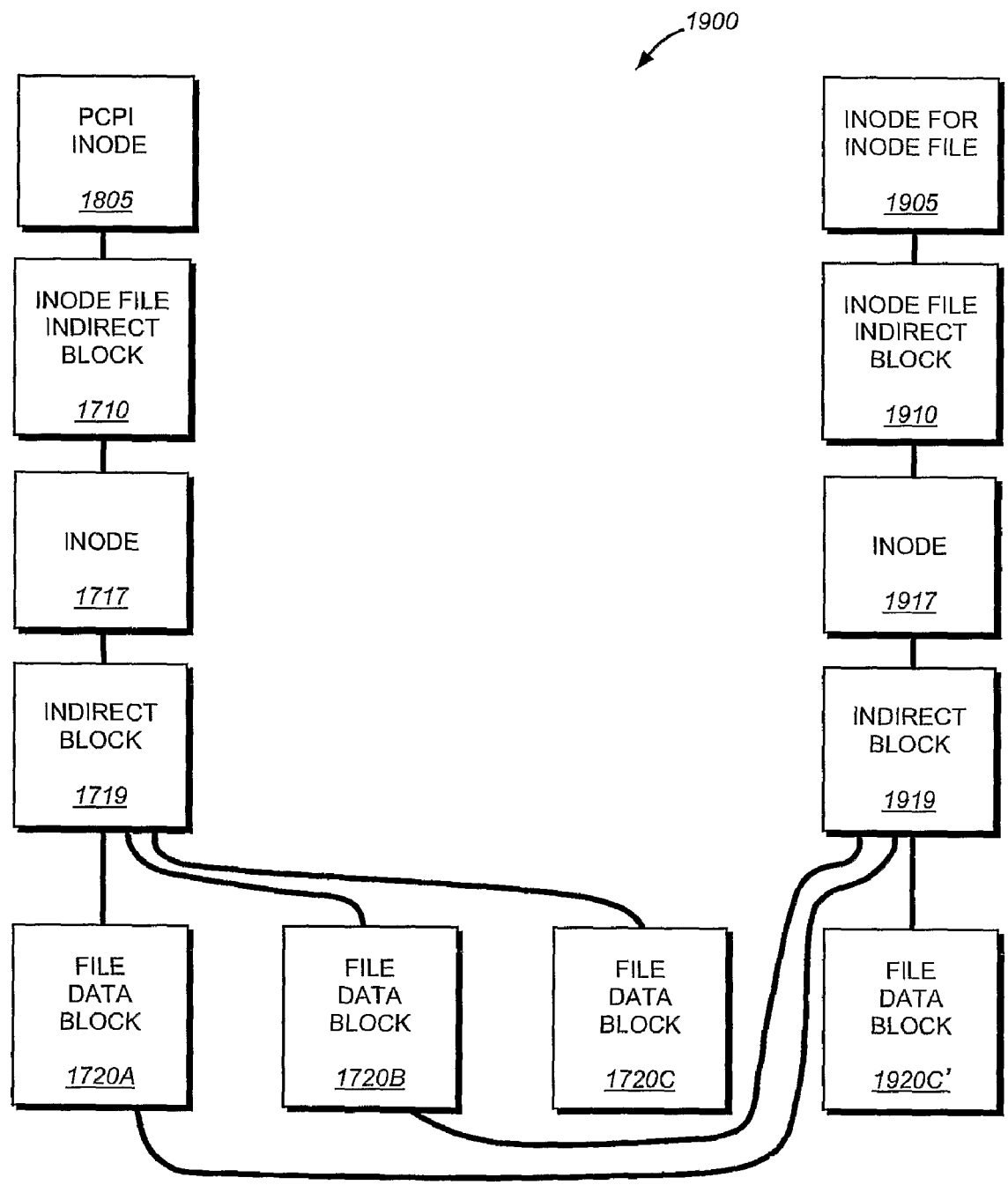
FIG. 19 is a schematic block diagram of an exemplary inode buffer tree showing a modified data block in accordance with an embodiment of the present invention.

When the file system generates a PCPI of its active file system, a PCPI inode is generated as shown in FIG. 18. The PCPI inode 1805 is, in essence, a duplicate copy of the inode for the inode file 1705 of the file system 1700 that shares common parts, such as inodes and blocks, with the active file system. For example, the exemplary file system structure 1700 includes the inode file indirect blocks 1710, inodes 1717, indirect blocks 1719 and file data blocks 1720A-C as in FIG. 17. When a user modifies a file data block, the file system writes the new data block to disk and changes the active file system to point to the newly created block. FIG. 19 shows an exemplary inode file system structure 1900 after a file data block has been modified. In this example, file data block 1720C is modified to file data block 1920C'. As a result, the contents of the modified file data block are written to a new location on disk as a function of the exemplary file system. Because of this new location, the indirect block 1919 must be rewritten. Due to this changed indirect block 1919, the inode 1917 must be rewritten. Similarly, the inode file indirect block 1910 and the inode for the inode file 1905 must be rewritten.

Thus, after a file data block has been modified the PCPI inode 1805 contains a pointer to the original inode file indirect block 1710 which, in turn, contains pointers through the inode 1717 and indirect block 1719 to the original file data blocks 1720A, 1720B and 1720C. The newly written indirect block 1919 also includes pointers to unmodified file data blocks 1720A and 1720B. That is, the unmodified data blocks in the file of the active file system are shared with corresponding data blocks in the PCPI file, with only those blocks that have been modified in the active file system being different than those of the PCPI file.

However, the indirect block 1919 further contains a pointer to the modified file data block 1920C' representing the new arrangement of the active file system. A new is inode for the inode file 1905 is established representing the new structure 1900. Note that meta-data (not shown) stored in any snapshotted blocks (e.g., 1805, 1710, and 1720C) protects these blocks from being recycled or overwritten until they are released from all snapshots. Thus, while the active file system inode for the inode file 1905 points to new blocks 1910, 1917, 1919, 1720A, 1720B and 1920C', the old blocks 1805, 1710 and 1720C are retained until the snapshot is fully released.

I. Parallel PCPIs for SVSs

The present invention is directed to a system and method for efficiently generating a set of parallel PCPIs of volumes configured as a SVS and served by a plurality of nodes interconnected as a cluster. The VOD 1140 executing on a node of the cluster is configured to manage generation of the volume PCPIs. Notably, the set of PCPIs is generated substantially in parallel to thereby obtain a consistent and accurate point in time reference of the entire SVS. The resulting point in time reference provides the basis for various volume-based operations in the cluster, including volume migration, image transfer, and mirroring operations.

According to an illustrative embodiment of the present invention, an administrator initiates the creation of the PCPIs by issuing a PCPI generation command to a volume operations daemon (VOD). In alternate embodiments, the initiation of a PCPI may be performed by automated processes, e.g., based on a timer, etc. In response, the VOD informs the VSM of the meta-data volume (MDV) to initiate a parallel or synchronized PCPI of the SVS. The VSM for the MDV then generates a CP and sends a request to each VSM serving a data volume (DV) of the striped volume set to generate a CP. Each of the VSMs then generates a CP of the appropriate DV. These "priming" CPs are utilized to flush the majority of dirty data out of any caches and to enable later PCPI productions an expedited basis. Once the VSM of the MDV receives an acknowledgment from each DV that it has generated an initial priming CP, the VSM of the MDV sets a first marker and sends a first message to each DV. Upon receipt, the VSM for each DV sets a first marker and returns an acknowledgement to the VSM of the MDV. After receiving an acknowledgment from each DV, the VSM of the MDV sets a second marker and generates a PCPI of the MDV. The VSM also sends a perform synchronized PCPI request to each DV, which causes the VSM for each DV to set a second marker and to generate a PCPI of the DV. The VSM of the MDV then sends a complete synchronized PCPI request to each DV, which causes the VSMs for each DV to remove the first and second markers and to return an acknowledgement. Once the MDV has received acknowledgements from each DV, the VSM for the MDV then removes its first and second markers. At this point the synchronized PCPIs have been generated.

Figure 20:
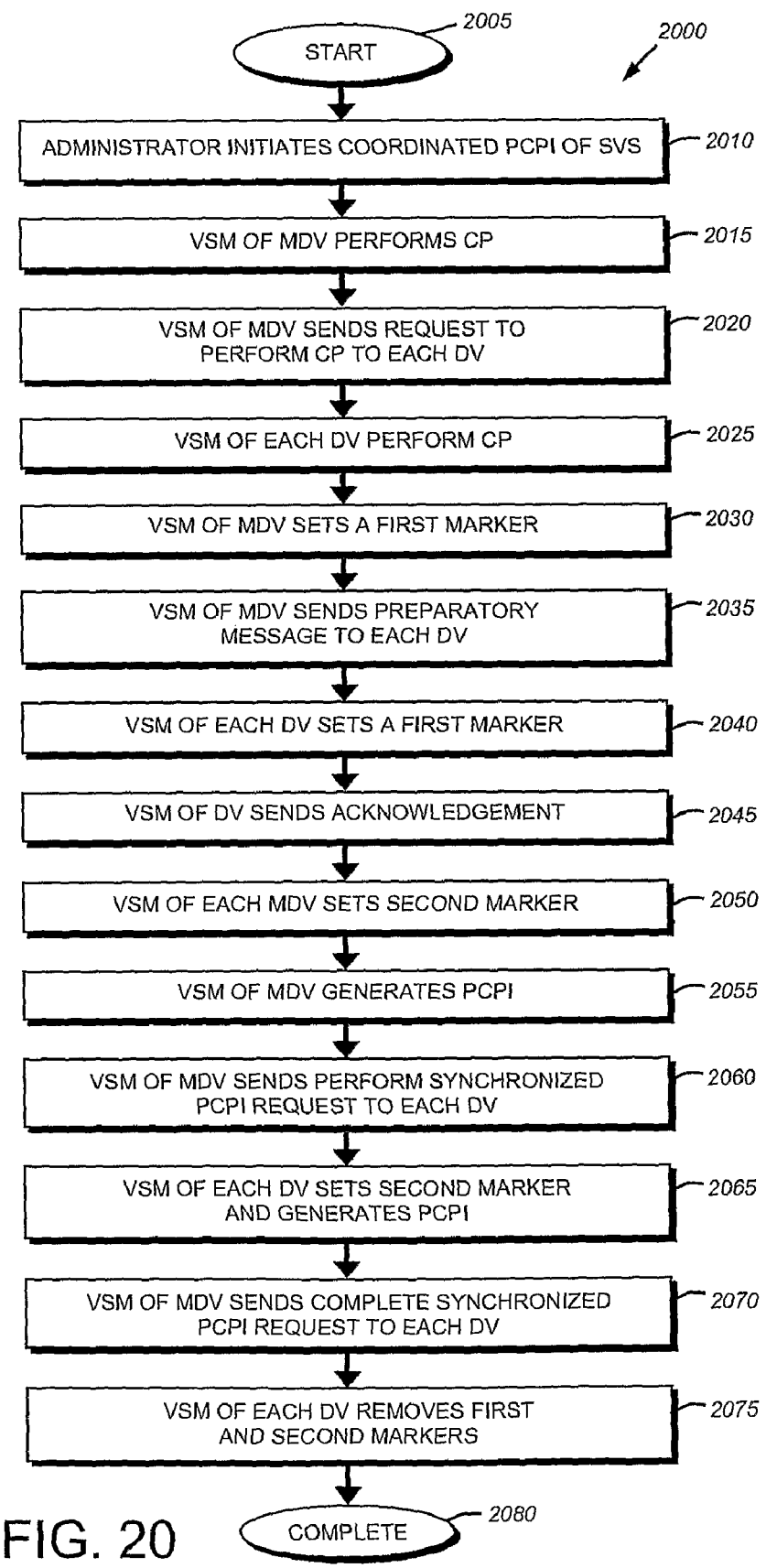
FIG. 20 is a flowchart detailing the steps of a procedure for generating parallel PCPIs in accordance with an embodiment of the present invention.

FIG. 20 is a flowchart detailing the steps of a procedure 2000 for generating parallel PCPIs in accordance with an embodiment of the present invention. The procedure 2000 begins in step 2005 and continues to step 2010 where an administrator initiates creation of a PCPI of a SVS. This may be accomplished by, for example, an administrator entering a command, such as a PCPI generation command, via the user interface of the management framework 1110. Alternatively, the PCPI may be initiated by a predefined timetable, e.g., a PCPI is generated every night at midnight. Furthermore, in alternative embodiments, other automated processes may be utilized to initiate the creation of parallel PCPIs. In response to the command, the VSM of the MDV performs a CP of the MDV in step 2015. The VSM of the MDV also transmits a command to perform a CP to each DV in the SVS. The VSM for each DV within the SVS then performs a CP in step 2025 in response to the received command. As each VSM performs its CP, it transmits an acknowledgement to the MDV. These initial (or "priming") CPs are generated to flush the majority of dirty data out of various system caches, which enables faster PCPI generation later when the actual parallel PCPI is generated.

Once the VSM of the MDV has received acknowledgements from each DV it then, in step 2030, sets a first marker that causes the VSM to complete any partially completed delete and modify/set attribute operations. The first marker also alerts the VSM to hold any newly received delete and modify/set attribute operations until after the parallel PCPIs are generated. This marker may be stored in the local storage 230 of a node or may be stored in any other suitable form of persistent storage. Then, in step 2035, the VSM of the MDV sends a preparatory message to each DV, which causes, in step 2040, the VSM for each DV to set a first marker. This first marker alerts the VSM of each DV to hold any newly received delete and modify/set attribute operations until after the parallel PCPIs are generated. The VSM of each DV then returns an acknowledgement in step 2045.

Once the VSM of the MDV has received an acknowledgement from each DV, it then, in step 2050, sets a second marker. This second marker causes all partially completed operations that modify the file system to be completed and causes any newly received operations that modify the file system to be held until the completion of the PCPI. The VSM of the MDV then, in step 2055, generates a PCPI of the MDV. This PCPI is the PCPI that is utilized as part of the parallel PCPI of the SVS. Additionally, the VSM of the MDV sends a request to perform a synchronized PCPI to the VSM of each DV in the SVS. In response, the VSM of each DV sets a second marker and generates a PCPI of the volume in step 2065. Each VSM of the DVs sends an acknowledgement back to the VSM of the MDV once the second marker has been set. Once the VSM of the MDV has received acknowledgements from all DVs, it then, in step 2070, sends a request to complete the synchronized PCPI to each DV. In response, the VSM of each DV removes the first and second markers in step 2075 before the procedure completes in step 2080. Thus, the present invention permits a set of parallel and synchronized PCPIs to be generated of the volumes comprising a SVS.

It should be noted that the use of two markers is illustrative only and that the present invention may be utilized with only the second marker. The first marker is illustratively provided to enable those operations that are less frequently invoked and which may take a longer period of time to complete, e.g., a cross stripe write that spans two or more of the SVS's, have sufficient time to be appropriately fenced before fencing more common, low cost operations. The second marker is utilized to provide a barrier to more common operations, e.g., a conventional read/write operation, that do not take a significant amount of time to complete. Using two markers prevents the barrier synchronization associated with time-consuming operations from disrupting the performance of lower cost operations, i.e., time consuming operations halting faster operations from being processed. Alternative embodiments can use two or more marker types to isolate the synchronization costs of earlier markers' operation classes from later markers' operation classes.

J. Consistent Image Creation of a Set of Data Objects

While there has been shown and described illustrative embodiments of a system and method for generating a set of synchronized parallel persistent consistency point images (PCPIs) of a set of volumes, it is to be understood that various other adaptations and modifications may be made within the spirit and scope of the invention. For example, the volumes included in a set may be heterogenous, for example, provided by multiple vendors and/or using various data types and/or organizations. The volumes may also comprise multiple distributed components, such as nested sets of volumes. Other adaptations and/or modifications may include application of volumes striped by a host-side or switchbased volume managers. As such, the principles of the present invention may be implemented in non-SVS environments. More generally, the present invention may be utilized to generate consistent images of any collection of data objects. The data objects may comprise luns, volumes, etc. Additionally, while the generation of PCPIs has been shown and described, any technique for generating a consistent image of a data object at a particular point in time may be utilized.

Figure 21:
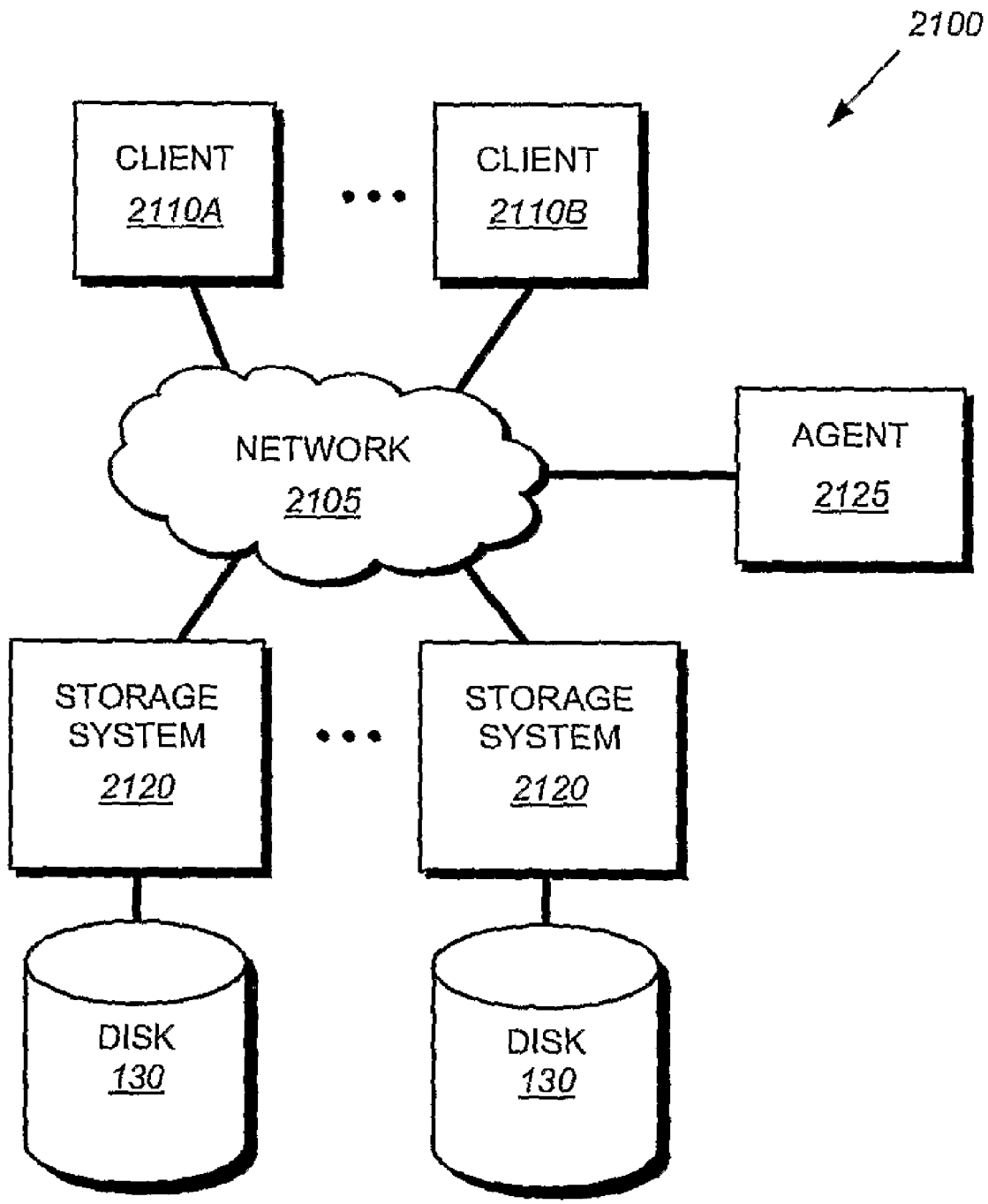
FIG. 21 is a schematic block diagram of an exemplary network environment in which the principles of the present invention may in implemented in accordance with an embodiment of the present invention.

FIG. 21 is a schematic block diagram of an exemplary network environment 2100 illustrating a generalized network environment in which the principles of the present invention may be implemented. The environment 2100 is centered around a network 2105. One or more clients 2110 are operatively interconnected with the network 2105. Also interconnected with the network are a plurality of storage systems 2120, each of which may service one or more data objects stored on disks 130. The data objects, which may be volumes, luns, etc., may be stored in a persistent image in accordance with the principles of the invention.

The clients 2110 may be general-purpose computers configured to interact with the storage systems 2120 in accordance with a client/server model of information delivery. That is, each client may request the services of the storage system, and the storage system may return the results of the services requested by the client, by exchanging packets over the network 2105. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage systems 2120 may comprise any form of storage system, including, for example, a NAS server, a SAN server, a multi-protocol SAN/NAS server, etc. Each storage system may service one or more data objects (or portions of data objects). For example, each storage system may service a lun. A volume manager (not shown) executing on the client 2110 may logically organize the luns serviced by the storage systems 2120 into another logical abstraction for use by clients.

Also executing within the environment 2100 is an agent 2125 that manages the creation of point in time images of the data objects. It should be noted that the agent 2125 may execute on a storage system 2120, a client 2110 or on a separate computer within the environment 2100, e.g., a management station (not shown).

Figure 22:
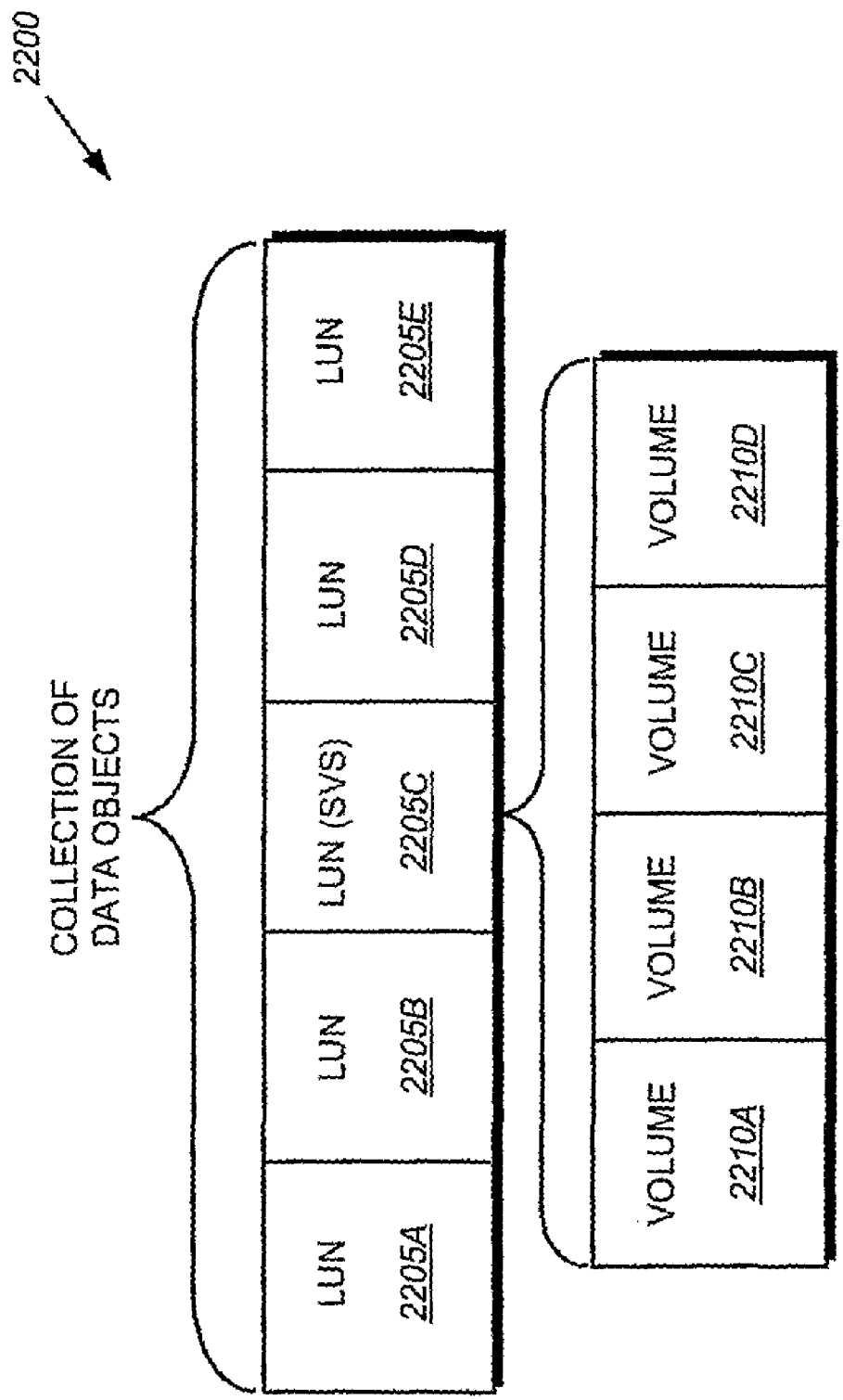
FIG. 22 is a schematic block diagram illustrating the nesting of sets of data objects in accordance with an embodiment of the present invention.

FIG. 22 is a schematic block diagram showing the nesting of data objects in accordance with an embodiment of the present invention. In accordance with alternate embodiments of the present invention, the data objects serviced by the storage systems may be nested, i.e., one of the constituent data objects may be comprised of a plurality of lower level data objects. The illustrative nesting environment 2200 shows a collection of data objects, e.g., luns 2205A-E, serviced by the storage systems. In accordance with the present invention, a persistent image is generated of the luns 2205. However, one lun 2205C may comprises a SVS so that lun 2205C actually comprises of volumes 2210A-D. Thus, when a persistent image of the collection of data objects 2205 is to be generated, the image of lun 2205C is comprised of individual images of volumes 2210A-D. It should be noted the environment 2200 is illustrative only and that nesting may occur with a plurality of data objects. Thus, for example, each of the data objects may be nested, or there may be a plurality of levels of nesting, i.e., a lower level is itself nested.

Figure 23:
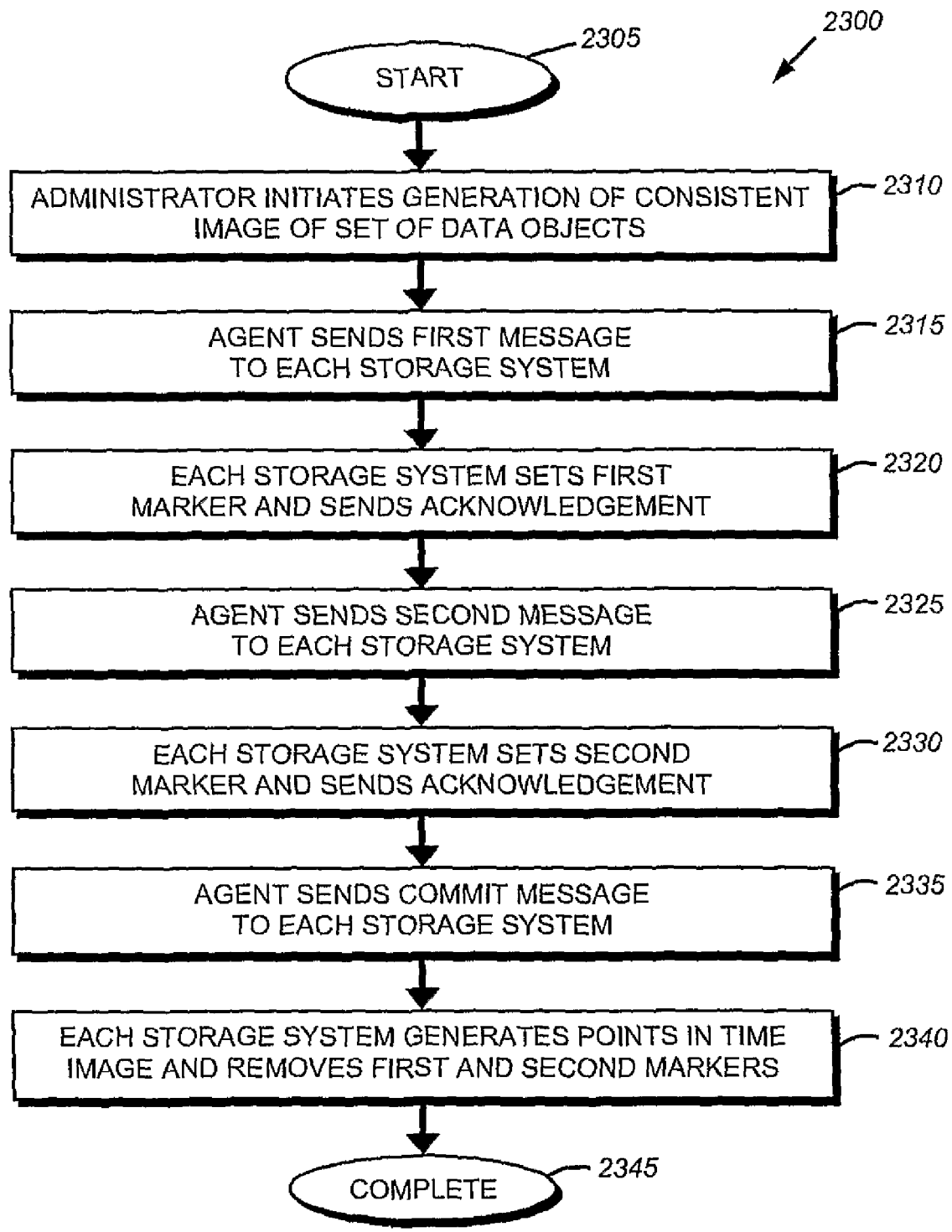
FIG. 23 is a flowchart detailing the steps of a procedure for generating persistent images of a set of data objects in accordance with an embodiment of the present invention.

FIG. 23 is a flowchart detailing the steps of a procedure 2300 for generating persistent images of a set of data objects in accordance with an embodiment of the present invention. The procedure 2300 begins in step 2305 and continues to step 2310 where the administrator initiates the generation of a consistent image of the set of data objects. This is initiation may occur by administrator command or may be the result of predefined times by the agent 2125 or due to other automated processes. In response to the initiation of the consistent image, the agent sends a first message to each storage system in the environment in step 2315. This first message is illustratively sent using a remote procedure call (RPC) but, in alternate embodiments, may be sent using any acceptable form of intercomputer communication. Upon receiving the first message, each storage system sets a first marker and sends an acknowledgement to the agent in step 2320. The first marker alerts the storage system to complete any previously received operations that modify the data object but to hold any newly received operations that modify the data set. If any of the data objects are nested, the storage system receiving the first message will forward the message to the lower level storage systems servicing the nested data objects. Only upon receiving acknowledgements from each of the nested storage systems will the storage system return an acknowledgement to the agent.

Once the agent has received acknowledgments from each of the storage systems, the agent then, in step 2325, sends a second message to each of the storage systems. Each storage system sets a second marker and returns an acknowledgement in step 2330. The second marker causes each storage system to complete any in progress operations that modify the data objects and to hold all newly received operations until the consistent image is created.

Once the agent receives acknowledgements from each of the storage systems regarding the second message, the agent sends a commit message to each of the storage systems in step 2335. In response, each storage system generates a consistent image of the data object(s) that it serves and then removes the first and second markers in step 2340. Once the persistent image is created and the markers removed, the storage system may resume processing of operations that modify the data object. The procedure 2300 then completes in step 2345.

It should be noted that in an alternate embodiment, the first message and first marker (steps 2315-2320) may be omitted and still generate an acceptable consistent image of the data objects.

The foregoing description has been directed to particular embodiments of this invention. It will be apparent, however, that other variations and modifications may be is made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for generating a set of persistent consistency point images of a plurality of volumes, comprising:

coupling two or more computers together to form a cluster;

organizing the plurality of volumes as a striped volume set, the plurality of volumes distributed across the cluster, and wherein each volume of the plurality of volumes is configured as a logical arrangement of one or more storage devices attached to at least one of the two or more computers;

striping a data object across each volume of the striped volume set;

setting a first marker for each volume of the striped volume set striped with the data object;

in response to the setting of the first marker, completing in progress operations that modify the data object and holding newly received operations that modify the data object; and generating a persistent consistency point image of each volume of the striped volume set striped with the data object, wherein generating the persistent consistency point image of each volume of the striped volume set comprises, setting a second marker for a meta-data volume of the striped volume set;

generating a second persistent consistency point image of the meta-data volume, sending a request to perform a synchronized persistent consistency point image to one or more volume striping modules serving one or more data volumes of the striped volume set, and generating a third persistent consistency point image of the one or more data volumes of the striped volume set.

2. The method of claim 1 wherein setting the first marker for each volume of the striped volume set comprises:

setting the first marker on a first volume striping module of the one or more volume striping modules serving the meta-data volume of the striped volume set;

forwarding a preparatory message to the one or more volume striping modules serving the one or more data volumes of the striped volume set; and in response to receiving the preparatory message, setting the first marker on the one or more volume striping modules serving the one or more data volumes of the striped volume set.

3. The method of claim 1 further comprising removing the first and the second marker.

4. The method of claim 1 further comprising performing a set of priming consistency points of the striped volume set.

5. The method of claim 1 wherein in response to the first marker being set, halting, by a first volume striping module of the one or more volume striping modules, received delete operations until a set of persistent consistency point images of the plurality of volumes organized as the striped volume set is generated.

6. A system for generating a set of persistent consistency point images of a plurality of volumes, comprising:

means for coupling two or more computers together to form a cluster;

a processor configured to execute an operating system of at least one of the two or more computers;

means for organizing the plurality of volumes as a striped volume set, the plurality of volumes distributed across the cluster, and wherein each volume of the plurality of volumes is configured as a logical arrangement of one or more storage devices attached to at least one of the two or more computers;

means for striping a data object across each volume of the striped volume set;

means for setting a first marker for each volume of the striped volume set striped with the data object;

means for completing in progress operations that modify the data object and means for holding newly received operations that modify the data object in response to the setting of the first marker; and means for generating a persistent consistency point image of each volume of the striped volume set striped with the data object, wherein the means for generating the persistent consistency point image of each volume of the striped volume set comprises, means for setting a second marker for a meta-data volume of the striped volume set, means for generating a second persistent consistency point image of the meta-data volume, means for sending a request to perform a synchronized persistent consistency point image to one or more volume striping modules serving one or more data volumes of the striped volume set, and means for generating a third persistent consistency point image of the one or more data volumes of the striped volume set.

7. The system of claim 6 wherein the means for setting the first marker for each volume of the striped volume set comprises:

means for setting the first marker on a first volume striping module of the one or more volume striping modules serving the meta-data volume of the striped volume set;

means for forwarding the preparatory message to the one or more volume striping modules serving the one or more data volumes of the striped volume set; and means for setting the first marker on the one or more volume striping modules serving the one or more data volumes of the striped volume set in response to receiving the preparatory message.

8. The system of claim 6 further comprising means for removing the first and the second marker.

9. The system of claim 6 further comprising means for performing a set of priming consistency points of the striped volume set.

10. The system of claim 6 wherein in response to the first marker being set, means for halting, by a first volume striping module of the one or more volume striping modules, received delete operations until a set of persistent consistency point images of the plurality of volumes organized as the striped volume set is generated.

11. A non-transitory computer-readable medium containing executable program instructions for execution by a processor coupled to two or more computers that form a cluster, comprising:

program instructions that organize a plurality of volumes as a striped volume set distributed across the cluster, wherein each volume of the plurality of volumes when organized is configured as a logical arrangement of one or more storage devices attached to at least one of the two or more computers;

program instructions that stripe a data object across each volume of the striped volume set;

program instructions that set a first marker for each volume of the striped volume set striped with the data object, and program instructions that, in response to the setting of the first marker, complete in progress operations that modify the data object and program instructions that hold newly received operations that modify the data object; and program instructions that generate a persistent consistency point image of each volume of the striped volume set striped with the data object, wherein the program instructions that generate the persistent consistency point image of each volume of the striped volume set comprise, program instructions that set a second marker for a meta-data volume of the striped volume set, program instructions that generate a second persistent consistency point image of the meta-data volume, program instructions that send a request to perform a synchronized persistent consistency point image to one or more volume striping modules serving one or more data volumes of the striped volume set, and program instructions that generate a third persistent consistency point image of the one or more data volumes of the striped volume set.

12. The non-transitory computer-readable medium of claim 11 wherein the program instructions that set the first marker for each volume of the striped volume set comprise:

program instructions that set the first marker on a first volume striping module of the one or more volume striping modules serving the meta-data volume of the striped volume set;

program instructions that forward a preparatory message to the one or more volume striping modules serving the one or more data volumes of the striped volume set; and program instructions that, in response to receiving the preparatory message, set the first marker on the one or more volume striping modules serving the one or more data volumes of the striped volume set.

13. A system for generating a set of persistent consistency point images of a striped volume set comprising of a plurality of volumes distributed across a cluster, comprising:

a plurality of storage device elements, each of the plurality of storage device elements configured to serve one or more of the plurality of volumes, at least one of the storage device elements comprising a volume striping module;

a processor configured to execute an operating system of at least one of the plurality of the storage device elements;

at least one of the storage device elements operable to be associated with a meta-data volume of the striped volume set and configured to:

stripe a data object across each volume of the striped volume set;

set a first marker for each volume of the striped volume set striped with the data object, in response to the setting of the first marker, the at least one storage device element further configured to complete in progress operations that modify the data object and further configured to hold newly received operations that modify the data object;

generate a persistent consistency point image of each volume of the striped volume set striped with the data object;

set a second marker for the meta-data volume of the striped volume set;

generate a second persistent consistency point image of the meta-data volume;

send a request to perform a synchronized persistent consistency point image to a second volume striping module serving one or more data volumes of the striped volume set; and generate a third persistent consistency point image of the one or more data volumes of the striped volume set.

14. The method of claim 1 further comprising:

receiving a message to set the first marker; and forwarding the message to one or more lower level storage systems in response to the data object being nested with at least one of the two or more computers.

15. The method of claim 14 further comprising:

returning, by at least one of the two or more computers, an acknowledgement upon receiving acknowledgements from each nested computer.

16. The system of claim 13 wherein at least one of the storage device elements is further configured to receive a message to set the first marker and further configured to forward the message to one or more lower level storage systems of the cluster in response to the data object being nested with one or more storage device elements of the plurality of storage device elements.

17. The system of claim 16 further comprising:

the at least one of the storage device elements further configured to return an acknowledgement upon receiving acknowledgements from each nested storage device element.

* * * * *

UNITED STATES PATENT AND TRADEMARK OFFICE
CERTIFICATE OF CORRECTION

PATENT NO.         : 8,224,777 B2
APPLICATION NO.    : 11/913036
DATED              : July 17, 2012
INVENTOR(S)        : Jeffrey S. Kimmel It is certified that error appears in the above-identified patent and that said Letters Patent is hereby corrected as shown below:

Col. 1, line 64 should read: "space. The file ~~to~~ system organizes the data blocks within the"

Col. 2, line 5 should read: "the data block ~~is~~ is thereafter stored (written) to a new location"

Col. 3, line 23 should read: "ferent storage system ~~is~~ in the cluster. Accordingly, no single"

Col. 5, line 19 should read: "inode buffer tree showing a ~~is~~ persistent consistency point"

Col. 6, line 41 should read: "~~NID blade~~N/D-blade for communicating with other N/D-blades in the"

Col. 6, line 51 should read: "or more than two processor ~~systern~~system. Illustratively, one pro-"

Col. 7, line 22 should read: "store information, ~~including~~including data and parity information."

Col. 7, line 57 should read: "directory may be implemented as a specially formatted ~~is~~ file"

Col. 8, line 36 should read: "provides data paths for accessing information ~~is~~ stored on the"

Col. 9, line 14 should read: "store meta-data describing the layout of its file system; ~~is~~"

Col. 11, line 54 should read: "using a data container ~~is~~ handle. Fig. 5 is a schematic block"

Col. 11, line 60 should read: "which the data container resides. The ~~iode~~inode number field 504"

Col. 12, line 32 should read: "Specifically, the data section 660 of a regular on-disk ~~Mode~~inode"

Col. 13, line 6 should read: "described in the previously ~~is~~ incorporated U.S. Pat. No."

Col. 14, line 21 should read: "accessing an owner map to ~~perfaun~~perform pvbn-to-vvbn transla-"

Col. 14, line 67 should read: "(flexible volume) contains ~~is~~ at least two files, a filesystem file"

Col. 16, line 55 should read: "1310 ~~to~~ contains an ID of the D-blade hosting the particular"

Col. 17, line 36 should read: "changing attribute meta-data, ~~includes ing~~including time stamps and"

Col. 18, line 13 should read: "for the file represented by ~~is~~ inode 1425 and DV 1410 is the"

Col. 18, line 49 should read: "SVS, whereas the ordering of volumes in the list ~~to~~ may"

Col. 19, line 30 should read: "a stripe of sparseness (S) 1642. Volume C 615 continues the"

Col. 20, line 11 should read: "describing the ~~is~~ inode file associated with a file system. In"

Col. 20, line 54 should read: "arrangement of the active file system. A new ~~is~~ inode for the"

Signed and Sealed this
Eighteenth Day of December, 2012

David J. Kappos
*Director of the United States Patent and Trademark Office*

CERTIFICATE OF CORRECTION (continued)
U.S. Pat. No. 8,224,777 B2

Col. 23, line 53 should read: "lun 2205C may ~~comprises~~comprise of a SVS so that lun 2205C actually"

Col. 23, line 67 should read: "consistent image of the set of data objects. This ~~is~~ initiation"

Col. 24, line 43 should read: "that other variations and modifications may be ~~is~~ made to the"

Col. 27, line 37 should read: "least one of the plurality of ~~the~~ storage device elements;"